United States Patent
Murotani

(10) Patent No.: US 7,313,579 B2
(45) Date of Patent: Dec. 25, 2007

(54) NETWORK STORAGE SYSTEM AND HANDOVER METHOD BETWEEN PLURALITY OF NETWORK STORAGE DEVICES

(75) Inventor: Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 10/944,787

(22) Filed: Sep. 21, 2004

(65) Prior Publication Data

US 2006/0020636 A1 Jan. 26, 2006

(30) Foreign Application Priority Data

Jul. 26, 2004 (JP) ............................. 2004-217031

(51) Int. Cl.
*G06F 17/30* (2006.01)
(52) U.S. Cl. ...................................... 707/204; 709/213
(58) Field of Classification Search ............ 707/103 R, 707/102, 3, 200, 205, 10, 9, 260, 103; 710/260
See application file for complete search history.

(56) References Cited

U.S. PATENT DOCUMENTS

| | | | | |
|---|---|---|---|---|
| 5,355,497 A | * | 10/1994 | Cohen-Levy | 707/200 |
| 5,668,943 A | | 9/1997 | Attanasio et al. | |
| 5,680,954 A | * | 10/1997 | Arnold et al. | 220/300 |
| 5,835,954 A | * | 11/1998 | Duyanovich et al. | 711/162 |
| 5,852,724 A | | 12/1998 | Glenn, II et al. | |
| 5,954,795 A | * | 9/1999 | Tomita et al. | 709/218 |
| 5,991,760 A | * | 11/1999 | Gauvin et al. | 707/10 |
| 6,108,748 A | * | 8/2000 | Ofek et al. | 711/112 |
| 6,240,486 B1 | * | 5/2001 | Ofek et al. | 711/112 |
| 6,816,951 B2 | * | 11/2004 | Kimura et al. | 711/162 |
| 2001/0051955 A1 | | 12/2001 | Wong | |
| 2002/0004890 A1 | * | 1/2002 | Ofek et al. | 711/161 |

(Continued)

FOREIGN PATENT DOCUMENTS

JP 2004-046661 7/2002

(Continued)

OTHER PUBLICATIONS

European Search Report dated Oct. 28, 2005.

*Primary Examiner*—Hosain Alam
*Assistant Examiner*—SyLing Yen
(74) *Attorney, Agent, or Firm*—Reed Smith LLP; Stanley P. Fisher, Esq.; Juan Carlos A. Marquez, Esq.

(57) ABSTRACT

The present invention shortens service termination times and permits rapid transfers. A file tree with the same structure as that of the file tree of a first NAS is formed in a second NAS beforehand. File data is not transferred to the tree. The second NAS saves an association between a file descriptor fd1 managed by the first NAS and fd2 managed by the second NAS. Services for a client are restarted when the transfer of the tree structure is complete. When the client requests access to a desired file by designating fd2, the second NAS converts fd2 to fd1 and requests file data from the first NAS. When the first NAS reads the file data, the second NAS stores the file data in a predetermined location and supplies the file data to the client. In cases where the client desires file access once again, the second NAS reads the transferred file data and supplies same to the client.

14 Claims, 25 Drawing Sheets

U.S. PATENT DOCUMENTS

| | | | |
|---|---|---|---|
| 2003/0182525 A1* | 9/2003 | O'Connell et al. | 711/162 |
| 2004/0010654 A1* | 1/2004 | Yasuda et al. | 711/1 |
| 2004/0133577 A1* | 7/2004 | Miloushev et al. | 707/10 |
| 2005/0257216 A1* | 11/2005 | Cornell et al. | 717/177 |

FOREIGN PATENT DOCUMENTS

| | | |
|---|---|---|
| WO | WO 03/023623 A1 | 9/2001 |
| WO | WO 03/023623 A1 * | 3/2003 |

\* cited by examiner

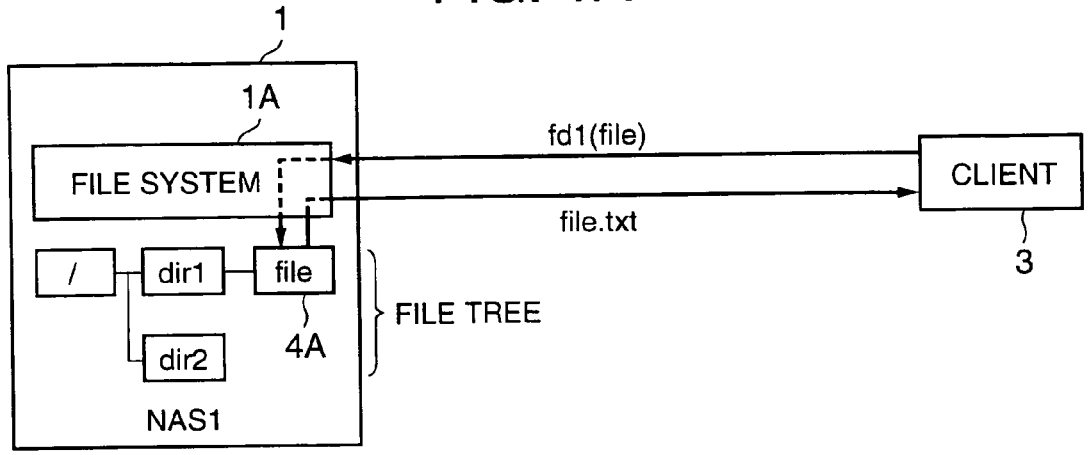
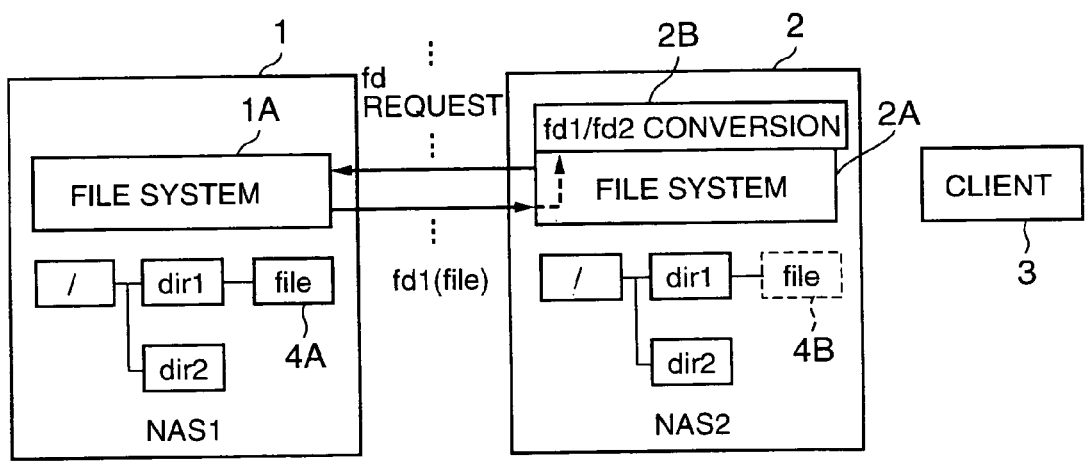
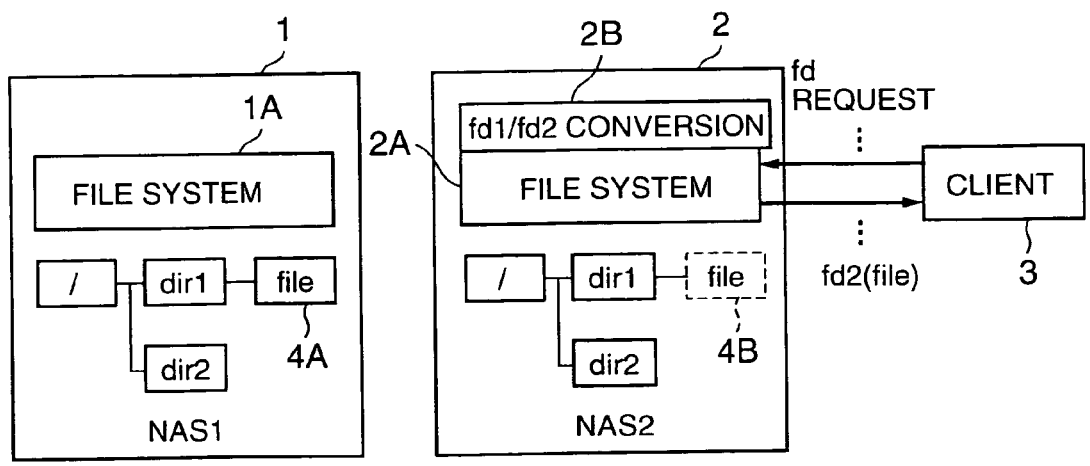

FIG. 9A

| fd-i-NODE CONVERSION TABLE | | ~T11 |
|---|---|---|
| fd(NEW) | i-NODE NUMBER | |
| 1112 | 2 | |
| 1113 | 3 | |
| ⋮ | ⋮ | |

FIG. 9B

| fd-fd CONVERSION TABLE | | ~T12 |
|---|---|---|
| NEW fd | OLD fd | |
| 1112("/") | 5552 | |
| 1113("usr") | 5560 | |
| ⋮ | ⋮ | |

FIG. 9C

| INTEGRATED TABLE (fd-i-node, fd-fd) | | | ~T11A |
|---|---|---|---|
| i-node NUMBER | NEW fd | OLD fd | |
| 2 | 1112("/") | 5552 | |
| 3 | 1113("usr") | 5560 | |
| ⋮ | ⋮ | ⋮ | |

NETWORK STORAGE SYSTEM AND HANDOVER METHOD BETWEEN PLURALITY OF NETWORK STORAGE DEVICES

CROSS-REFERENCE TO RELATED APPLICATIONS

This application relates to and claims priority from Japanese Patent Application No. 2004-217031 filed on Jul. 26, 2004, the entire disclosure of which is incorporated herein by reference.

BACKGROUND OF THE INVENTION

The present invention relates to a network storage system and a handover method between a plurality of network storage devices.

A network storage device is a storage device that is connected to a communication network such as the Internet or a LAN that is shared by a plurality of computers. NAS (Network Attached Storage) or similar is a known example of a network storage device. In organizations such as enterprises, municipalities, or schools, one or a plurality of network storage devices are introduced to construct a network storage system in order to manage enormous amounts of data.

Because of the volume of data to be managed by such organizations increases on a daily basis, the administrator of a network storage system is, before long, confronted by a shortage of network storage capacity. Alternatively, in cases where the number of clients using a network storage device has increased and so forth, the administrator examines improvements to the response of the network storage device.

In order to accommodate the shortfall in network storage capacity and the drop in response, and so forth, the existing network storage device is replaced with a new network storage device or the existing network storage device is used in combination with a newly added network storage device (Japanese Patent Application Laid Open No. 2004-46661). With the conventional technology appearing in Japanese Patent Application Laid Open No. 2004-46661, the hierarchical directory structure of the existing network storage device, that is, the file tree structure thereof, is first copied to the newly installed network storage device and then files are transferred from the existing network storage device to the newly installed network storage device in accordance with an access request from the client.

When the client attempts initial access to a desired file after a reboot or the like, the client instructs the network-storage file system of the name of the object file and the directory name to which the file belongs. The file system then sequentially follows the file tree, which is a hierarchical directory structure, on the basis of information designated sequentially by the client and thus detects the requested file. For example, in cases where the client attempts access to file C that exists in a subdirectory B below directory A, the file system follows the file tree sequentially in the order of directory A, then subdirectory B, and then file C, and thus finds the object file C.

In order to allow the file system to subsequently access the file easily, file identification information (a file handle, or the like, for example) that is uniquely identified within the file system is issued and sent to the client. In the process in which the file system sequentially follows the file tree, file identification information for specifying each directory and file is communicated to the client.

The client then holds the file identification information issued by the file system in memory. As mentioned earlier, the file identification information is information for directly designating a file in the file system. Therefore, when the file is next accessed, the client requests the object file by directly designating the file identification information with respect to the network storage device. The file system directly specifies the requested file on the basis of the file identification information and thus provides the client with access to the file. Therefore, when valid file identification information has been inputted, the client need not search for the file by following the file tree sequentially.

Likewise, the newly installed network storage device is able to specify directly the file on the file system on the basis of file identification information. However, the file identification information is merely information uniquely identifying a file on the file system. It is not possible to specify directly the position of the file in the file tree by means of file identification information alone. Further, the file identification information basically functions effectively on the file system that issued the file identification information and cannot be used on a different file system.

Therefore, even when file access has been requested by the client, the newly installed network storage device is unable to specify the requested file in cases where a file is designated by using file identification information issued by a file system other than the file system of the newly installed network storage device or in cases where the requested file does not exist on the newly installed network storage device.

That is, the file system of the newly installed network storage device is unable to specify where the requested file is located in the existing network storage device on the basis of the file identification information issued by the file system of the existing network storage device alone and is therefore unable to access the substance of the requested file.

Therefore, in the technology appearing in Japanese Patent Application Laid Open No. 2004-46661, access by the newly installed network storage device to a file that has not already been transferred from the existing network storage device to the newly installed network storage device is difficult.

Hence, in the case of the technology appearing in Japanese Patent Application Laid Open No. 2004-46661, it is not enough to simply copy the file tree structure of the existing network storage device to the newly installed network storage device beforehand. It is also necessary to transfer the data of the whole file tree (or a predetermined range thereof), from the pre-specified upper directory to the lower directory, before starting file sharing services from the newly installed network storage device. In other words, file sharing services can be provided only within the range in which the data is transferred to the newly installed network storage device.

Therefore, in the case of the technology appearing in Japanese Patent Application Laid Open No. 2004-46661, file sharing services cannot be restarted during the interval up until the data transfer of the whole file tree from the existing network storage device to the newly installed network storage device is complete. As a result, replacement of the network storage device takes a long time. Further, with the technology appearing in Japanese Patent Application Laid Open No. 2004-46661, the data must have already been transferred before services are restarted, meaning that data cannot be transferred while file sharing services are being provided to the client.

Furthermore, the technology appearing in Japanese Patent Application Laid Open No. 2004-46661 also proposes virtually unifying the new network storage device by means of a virtual unification function with which the newly installed network storage device is provided, for example, and allocating an access request to each of the new and old network storage devices according to the priority of the requested file. However, although this virtual unification is significant from the perspective of the practical application of assets, the existing network storage device cannot be completely replaced with a newly installed network storage device. Therefore, an old file group that has been stored in the existing network storage device must be supplied by the existing network storage device whose access performance is relatively poor, and hence the response of the whole system drops. Further, the old-type network storage device with inferior performance must be maintained indefinitely, which increases the maintenance and running costs of the system.

SUMMARY OF THE INVENTION

Accordingly, an object of the present invention is to provide a network storage system and a handover method between a plurality of network storage devices that, even when access to a file that has not been transferred to a second network storage device is requested, make it possible to specify the file immediately on the file system of a first network storage device that stores the file, acquire data from the first network storage device and supply the data to a client, and transfer (hand over) file sharing services from the first network storage device to the second network storage device in a relatively short period.

An object of the present invention is to provide a network storage system and handover method between a plurality of network storage devices that makes it possible to implement a data transfer in file units between network storage devices in a relatively short period without changing the stored content of the first network storage device in which the file is stored and without adding special functions to the first network storage device. Further objects of the present invention will become apparent from the description of the subsequent embodiments.

In order to resolve the above problem, the network storage system of the present invention has a constitution that makes it possible to directly specify a file that has not been transferred from the first network storage device (existing network storage device) to the second network storage device (newly installed network storage device) on the first network storage device and of transferring data in file units. Accordingly, the network storage system of the present invention is able to commence file sharing services before transferring the data of the whole file tree.

That is, the network storage system of the present invention is a network storage system having a first network storage device for storing a file that is supplied to a client and a second network storage device that is connected to the client and the first network storage device, further comprising a file tree generation unit that generates a second file tree, which has the same structure as that of a first file tree of the first network storage device, on a second network storage device as the hierarchical directory structure of a file system; a file specifying unit for specifying a file on the first network storage device that is requested by the client on the basis of an access request made to the second network storage device by the client in order to access a file on the first network storage device; and a file transfer unit that acquires the attributes and data of the specified file from the first network storage device and stores the acquired file in a predetermined location in the second file tree.

The client requests access to a desired file on the second network storage device by means of a command that contains file identification information such as a file descriptor, for example. The file system of the second network storage device then specifies the requested file on the file system of the first network storage device on the basis of file identification information provided by the client. The second network storage device acquires the attributes and data of the specified file from the file system of the first network storage device and stores the acquired file in a predetermined location in a second file tree. Further, the file thus transferred from the first network storage device to the second network storage device is supplied by the second network storage device to the client in accordance with a request.

As a result, even in cases where access to a file that has not been transferred to the second network storage device is requested by the client, the requested file can be acquired from the first network storage device and supplied to the client. Further, in substantially the same period in which the file is supplied to the client, the requested file can be stored in a predetermined location in the second file tree. Here, a 'predetermined location' indicates a storage location that corresponds to a storage location on the first file tree. In cases where a file access request is generated after a file has been transferred to the second network storage device, the second network storage device directly specifies the file on its own file system without accessing the first network storage device and supplies the file to the client.

Here, a file transfer unit is able to acquire the file from the first network storage device without changing the stored content of the first network storage device and store the file in a predetermined location in the second file tree. That is, because data is transferred to the second network storage device in file units while retaining the stored content of the first network storage device, a backup of the stored content of the first network storage device need not be made in preparation for the unexpected.

The file transfer unit is capable of storing the acquired file in a predetermined location in the second file tree when the file acquired from the first network storage device satisfies a predetermined condition. For example, if the file usage frequency is equal to or more than a predetermined value, the file can be stored in a predetermined location in the second file tree.

Here, for example, a file specifying unit is able to specify the file requested by the client on the first network storage device by referencing file specifying information that is constituted by associating first file identification information for specifying a file on the first network storage device with second file identification information for specifying a file on the second network storage device.

The file specifying unit is able to construct file specification information on the basis of a request to access a file on the first network storage device from the client. That is, for example, the file specifying unit acquires first file identification information from the first network storage device on the basis of a request to access a file on the first network storage device from the client and is then able to construct file specification information by associating the acquired first file identification information with second file identification information generated in response to the access request.

To cite an example, in cases where the client has requested file access from the second network storage device by using first file identification information, the file system of the second network storage device rejects the access request because the first file identification information is invalid (stale) and requests that the client 'retry' the request.

The client that received the retry request sequentially follows the file tree until the object file is reached while designating the directory name and file name. In sync with the process in which the client sequentially follows the file tree, the file system of the second network storage device accesses the file system of the first network storage device and sequentially follows the first file tree. Next, when the object file is finally reached, the file system of the second network storage device acquires the first file identification information for uniquely specifying the file on the first network storage device from the file system of the first network storage device. Here, the attributes and data of the file may be acquired from the file system of the first network storage device and then saved, or may not be acquired. A case where the file attributes and data are not acquired will be described.

Furthermore, the file system of the second network storage device associates first file identification information acquired from the file system of the first network storage device with second file identification information that is issued by the file system of the second network storage device itself and registers the associated first and second file identification information as file specification information. Further, the file system of the second network storage device then communicates the second file identification information to the client. The client then saves the second file identification information thus communicated to memory and requests access to a desired file by using the second file identification information.

Upon receiving the access request from the client, the file system of the second network storage device references the file specification information and acquires first file identification information that corresponds with the second file identification information. The file system of the second network storage device then requests data and attributes of the file from the file system of the first network storage device by using the first file identification information. The file system of the second network storage device saves the data and attributes of the file acquired from the first network storage device in a predetermined location and supplies the file to the client.

Therefore, the file system of the second network storage device is able to execute processing that is the same as retry access by the client (processing to follow the file tree sequentially) with respect to the file system of the first network storage device as if same were itself the client. Further, in the process of following the first file tree of the first network storage device sequentially, the second network storage device is able to construct the second file tree with the same structure as that for the first file tree.

The file tree generation unit is able to generate the second file tree by associating transfer state information, which indicates whether a file on the first network storage device has been transferred to a predetermined location on the second file tree, with the structure of the second file tree. The file tree structure can be shown by the method by which each element constituting the tree (files, directories, and so forth) is connected. Therefore, information that indicates whether the substance (data) of the file has been transferred to the second network storage device (transfer state information) is associated with a file, which is one element constituting the structure of the file tree. That is, information indicating that data of the file has not yet been transferred is associated with the location in which the data of the file should be stored in future. As a result, the file system of the second network storage device is able to judge instantly whether the file has been transferred by referencing the transfer state information.

When the file tree generation unit generates a second file tree, which constitutes a hierarchical directory structure, the file specifying unit is able to pre-store first file identification information acquired from the first network storage device in file specification information. Further, the file specifying unit is able to construct file specification information broadly in two stages by storing second file identification information, which is generated in association with the first file identification information whenever an access request from the client is processed, with the first file identification information that was pre-stored in the file specification information and then storing the associated file identification information in the file specification information. That is, the first stage is a stage in which the first file identification information is registered in file specification information and the second stage is a stage in which the second file identification information is associated with the first file identification information and the associated file identification information is registered in file specification information.

The functions, means, and all or part of the steps of the present invention can sometimes be constituted as a computer program that is run by a microcomputer, for example. Further, the computer program can be distributed fixed to a storage medium such as a hard disk, optical disk, semiconductor memory, or the like, for example. Alternatively, the computer program can be distributed via a communication network such as the Internet.

BRIEF DESCRIPTION OF THE DRAWINGS

FIG. 1 is an explanatory view of the concept of the embodiment of the present invention;

FIG. 9 is an explanatory view that shows the schematic structure of a variety of tables that are stored in the new NAS, in which FIG. 9A shows an fd-i-node conversion table, FIG. 9B shows an fd-fd conversion table; FIG. 9C shows a table rendered by integrating the fd-i-node conversion table and fd-fd conversion table;

DESCRIPTION OF THE SPECIFIC EMBODIMENTS

Figure 2D:
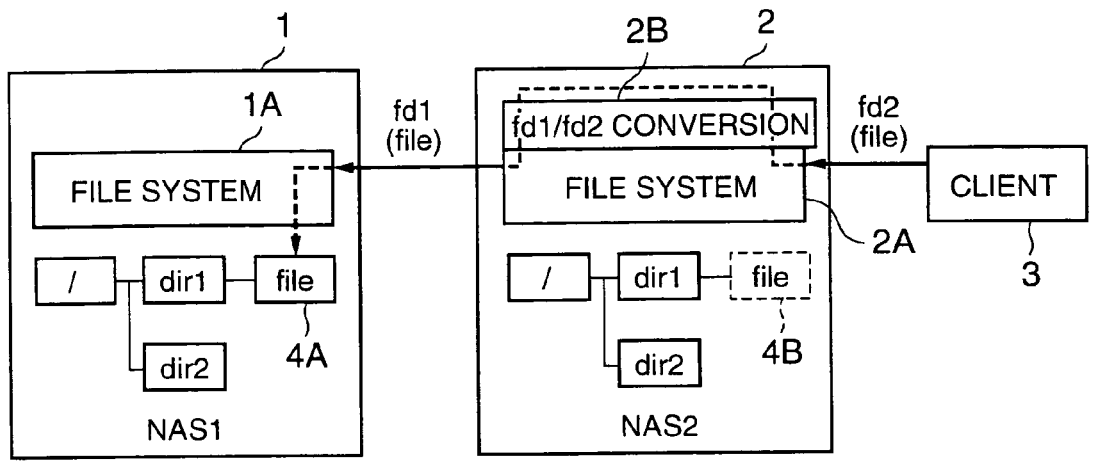
FIG. 2 is an explanatory view of the concept of the embodiment of the present invention that follows on from FIG. 1.

An embodiment of the present invention will be described hereinbelow with reference to the drawings. FIGS. 1 and 2 are explanatory views of the overall concept according to one aspect of the embodiment. The storage system of the embodiment comprises a first network storage device 1 for storing a file supplied to a client 3, and a second network storage device 2 that is connected to the client 3 and the first network storage device 1.

In this storage system, a second file tree with the same structure as that of the first file tree of the first network storage device 1 is generated in the second network storage device 2 as a hierarchical directory structure for the file system. Next, on the basis of a request to access a file on the second network storage device 2 from the client 3, the file requested by the client 3 is specified on the first network storage device 1, the attributes and data of the specified file are acquired from the first network storage device 1, and the acquired file is stored in a predetermined location in the second file tree.

FIG. 1A shows the state of the storage system before the second network storage device 2 is added. The client 3 requests a desired file from the file system 1A of the first network storage device 1 by designating file identification information fd such as a file descriptor.

File identification information fd is information for uniquely specifying the file within a file system, OS (Operating System), or the like, that manages the file (sometimes also including the directory). A file descriptor, for example, can be cited as the file identification information fd. By using a file descriptor, a file can be specified simply without designating the full path such as "/usr/dir1/file1.txt", for example. Rules for generating file descriptors depend on the type of file system and differ from one file system to the next. A management system in which a buffer management system or the like is included in the file descriptor is known as a file handle.

For example, when the client 3 does not hold file identification information for the desired file as is the case immediately after the client computer starts up, the client 3 acquires file identification information from the file system 1A by following the file tree sequentially to the desired file. The client 3 then requests file access from the file system 1A by designating the file identification information.

When file identification information is designated by the client 3, the file system 1A directly specifies the designated file among a group of files under its own management on the basis of the file identification information, and supplies the specified file to the client. If the designated file has been deleted, the file identification information is treated as stale information and an error is communicated by the file system 1A to the client 3. The file identification information that is managed by a first file system 1A is fd1 and file identification information that is managed by a second file system 2A is fd2, both of which are omitted from the following description.

FIG. 1B is an explanatory view of a case where the second network storage device 2 has been added to the storage system. The second network storage device 2 is introduced in order to replace the first network storage device 1. Network configuration information such as an IP address is handed over from the first network storage device 1 to the second network storage device 2 so that the second network storage device 2 acts on behalf of the first network storage device 1.

The second network storage device 2 can be introduced after the provision of information processing services is complete, for example. Further, as will become evident from subsequent embodiment examples, in the case of the present invention, the second network storage device 2 can be introduced to the storage system even while information processing services are being provided and a transfer from the first network storage device 1 to the second network storage device 2 can be performed without interrupting information processing services.

The file system 2A of the second network storage device 2 constructs a file tree in the second network storage device 2 by communicating with the file system 1A of the first network storage device 1, the file tree having the same structure as that of the file tree of the first network storage device 1.

Here, in this specification, a 'file tree' signifies a tree structure constituting the hierarchical directory structure, that is, by way of example, a 'container' with a predetermined structure, which is used separately from the data constituting the substance of the file. Therefore, even in cases where a file tree structure is copied from the first network storage device 1 to the second network storage device 2, the data of individual files is not transferred.

Copying of a file tree structure is executed as a result of a list request command or the like being sent from the second file system 2A to the first file system 1A and the second file system 2A responding to the command, for example. The second file system 2A follows the tree structure sequentially downward from the root directory of the first file tree ("/") while copying the file tree with this structure. For example, in a case where directories "usr", "etc" exist below the root directory, the second file system 2A allocates an i-node number to "usr", "etc" respectively and copies a tree structure by specifying a link between the i-node numbers.

At the time a file tree, which constitutes a file storage container, is copied to the second network storage device 2, file data is not copied. As shown in FIG. 1B, data of a file 4A stored by the first network storage device 1 has not yet been copied to the second network storage device 2. Only the location 4B to which the file data is to be copied has been secured.

Further, when the file tree structure is copied from the first network storage device 1 to the second network storage device 2, the file system 2A of the second network storage device 2 can acquire the fd1 of each of the constituent elements of the file tree structure (individual directories and files) from the first file system 1A. The fd1 thus acquired can then be registered in a conversion unit 2B.

The conversion unit 2B, which performs management by associating fd1, which is managed by the first file system 1A, and fd2, which is managed by the second file system 2A, can be generated at a plurality of times. As will become evident from subsequent embodiment examples, according to one method, it is possible to gradually construct associations between fd1 and fd2 on the basis of an access request from the client 3 after copying the file tree structure. In another method, fd1 and the i-node number managed by the second file system 2A are associated when the file tree structure is copied and then fd2 and fd1 can be associated when fd2 is issued on the basis of an access request from the client 3.

FIG. 1C shows an aspect in which the provision of services by the second network storage device 2 is restarted. The client 3 acquires the fd2 for the desired file from the file system 2A of the second network storage device 2. To facilitate the description, the fd of the desired file is shown as 'fd (file)'. The client 3 is able to obtain the fd2 (file) for specifying the desired file by following the file tree structure of the second network storage device 2 sequentially from the top. Because, in this embodiment, NAS services can be supplied to the client 3 by the second network storage device 2 at the moment the transfer of the file tree structure is complete, the service termination period can be shortened.

Let us now return to FIG. 2. FIG. 2D shows an aspect in which the client 3 requests access to the desired file by using the fd2 (file) obtained from the second file system 2A.

When the second file system 2A receives the fd2 (file) from the client 3, the fd2 (file) is converted by the conversion unit 2B into the fd1 (file) managed by the first file system 1A. The second network storage device 2 then designates the fd1 (file) and requests acquisition of the desired file from the first network storage device 1.

Figure 2E:
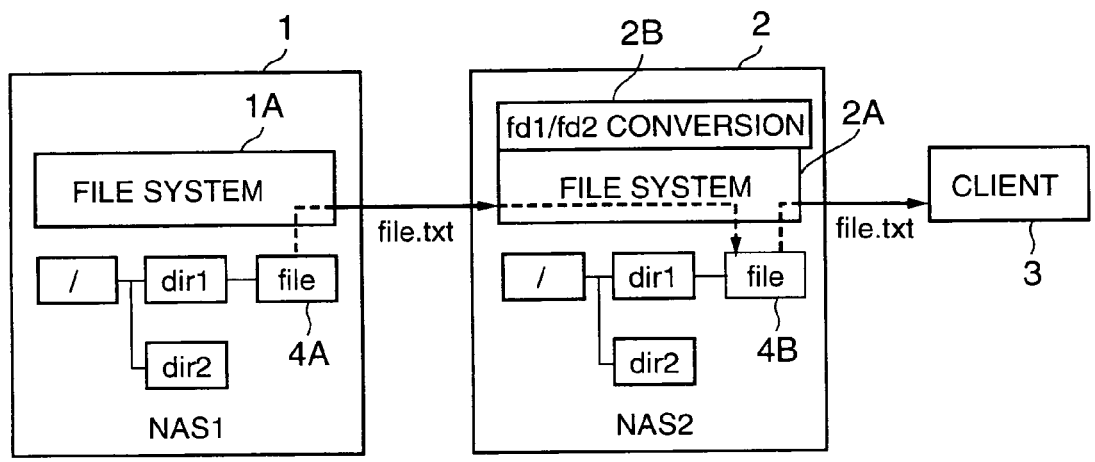

As shown in FIG. 2E, upon receiving the fd1 (file) from the second network storage device 2, the first file system 1A immediately specifies the file and transfers the data and attributes of the file to the second network storage device 2. Here, if, when the second network storage device 2 requests acquisition of the file by using fd2 (file) instead of fd1 (file), the first file system 1A is unable to specify the file on the basis of the fd2 (file) and therefore returns an error.

However, in the case of this embodiment, the second network storage device 2 requests a file by using the fd1 (file) that is managed by the first file system 1A, and therefore the file system 1A is able to specify the requested file immediately and send the data of the file to the second network storage device 2.

Upon receipt of the file data from the first network storage device 1, the second network storage device 2 stores the data in the predetermined location 4B of the file tree. As mentioned earlier, the storage location 4B is a position in the hierarchical directory structure where the file data is to be stored which is generated when the file tree is copied.

The second network storage device 2 stores the file in the predetermined location 4B and sends the file data to the client 3. Therefore, the designation of the fd2 (file) with respect to the second network storage device 2 in order to be able to acquire the desired file can be seen by the client 3. The exchange between the second network storage device 2 and first network storage device 1 is therefore hidden from the client 3.

Figure 2F:
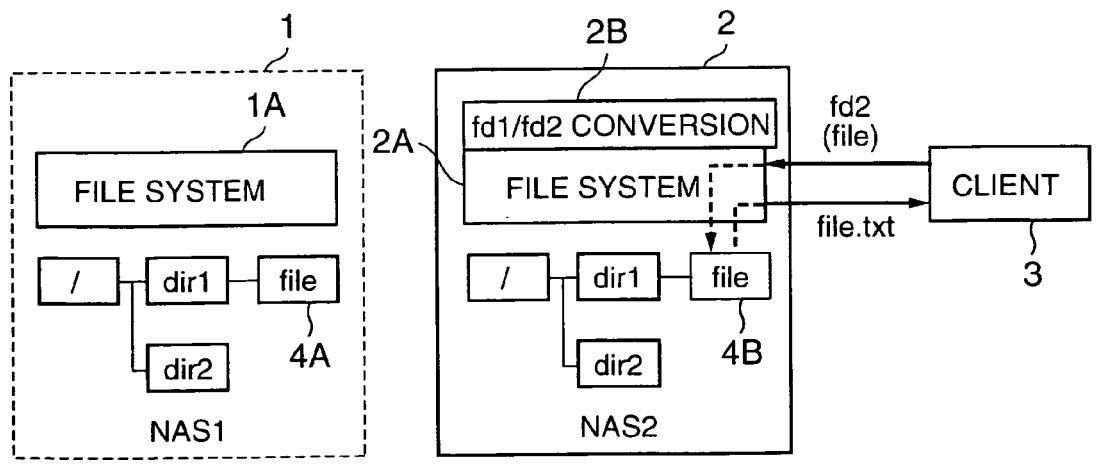

FIG. 2(f) shows a state after a file group held by the first network storage device 1 has been transferred to the second network storage device 2. As mentioned earlier, in the case of the present embodiment, the file tree structure alone is first transferred and services are restarted, whereupon the data of the requested file is individually transferred from the first network storage device 1 to the second network storage device 2 in accordance with a request from the client 3.

Therefore, according to the present embodiment, when the client 3 requires a file, only the required file can be transferred in file units. While such an operation is continued, a multiplicity of file groups contained in the first network storage device 1 is copied to the second network storage device 2. The file groups still remaining in the first network storage device 1 are file groups that are not required by the client 3 and therefore may be deleted or may remain in preparation for a later date. Here, when a transfer is made from the first network storage device 1 to the second network storage device 2, because there is no change in the stored content of the first network storage device 1, the data of the first network storage device 1 need not be backed up. The file groups held by the first network storage device 1 can be held unchanged in the first network storage device 1 itself.

As mentioned earlier, in cases where file groups in the range required by the client 3 are transferred from the first network storage device 1 to the second network storage device 2, the second network storage device 2 is replaced by the first network storage device 1. The client 3 may then request file access from the second file system 2A by designating fd2 and the second network storage device 2 need not convert fd2 to fd1 and need not access the first network storage device 1.

Here, in cases where files are transferred from the first network storage device 1 to the second network storage device 2, predetermined conditions can be established. That is, when a file read by the first network storage device 1 fulfils a predetermined condition, the read file can be stored in a predetermined location in the second file tree.

Predetermined conditions can include the file usage frequency or the like, for example. In cases where the usage frequency of the file read from the first network storage device 1 is equal to or more than a predetermined value, it is judged that the predetermined condition is fulfilled and the file is stored in a predetermined location in the second file tree.

Examples of file usage frequencies may include whether access to the file takes place a predetermined number of times or more within a predetermined period, whether a predetermined period from the day the file was last updated has been exceeded, or whether the number of sharing clients accessing the file is equal to or more than a predetermined value.

Even when access to a file with a low usage frequency is requested by the client 3, the file can remain on the first network storage device 1 without being transferred from the first network storage device 1 to the second network storage device 2. Each time access to a file remaining on the first network storage device 1 is requested by the client 3, the second network storage device 2 accesses the first network storage device 1 to perform reading. Because a file with a low usage frequency is not transferred to the second network storage device 2 but instead remains on the first network storage device 1, a file with a low usage frequency can be selected naturally and hence the storage region of the second network storage device 2 can be used efficiently. Naturally, the predetermined condition (file transfer condition) need not be fixed: same may be changed dynamically. For example, in cases where an access request from the client 3 reaches a predetermined frequency, for example, the file can be transferred from the first network storage device 1 to the second network storage device 2.

A more detailed constitution of the network storage system will be described hereinbelow with reference to FIG. 3 and subsequent figures.

1. First Embodiment

Figure 3:
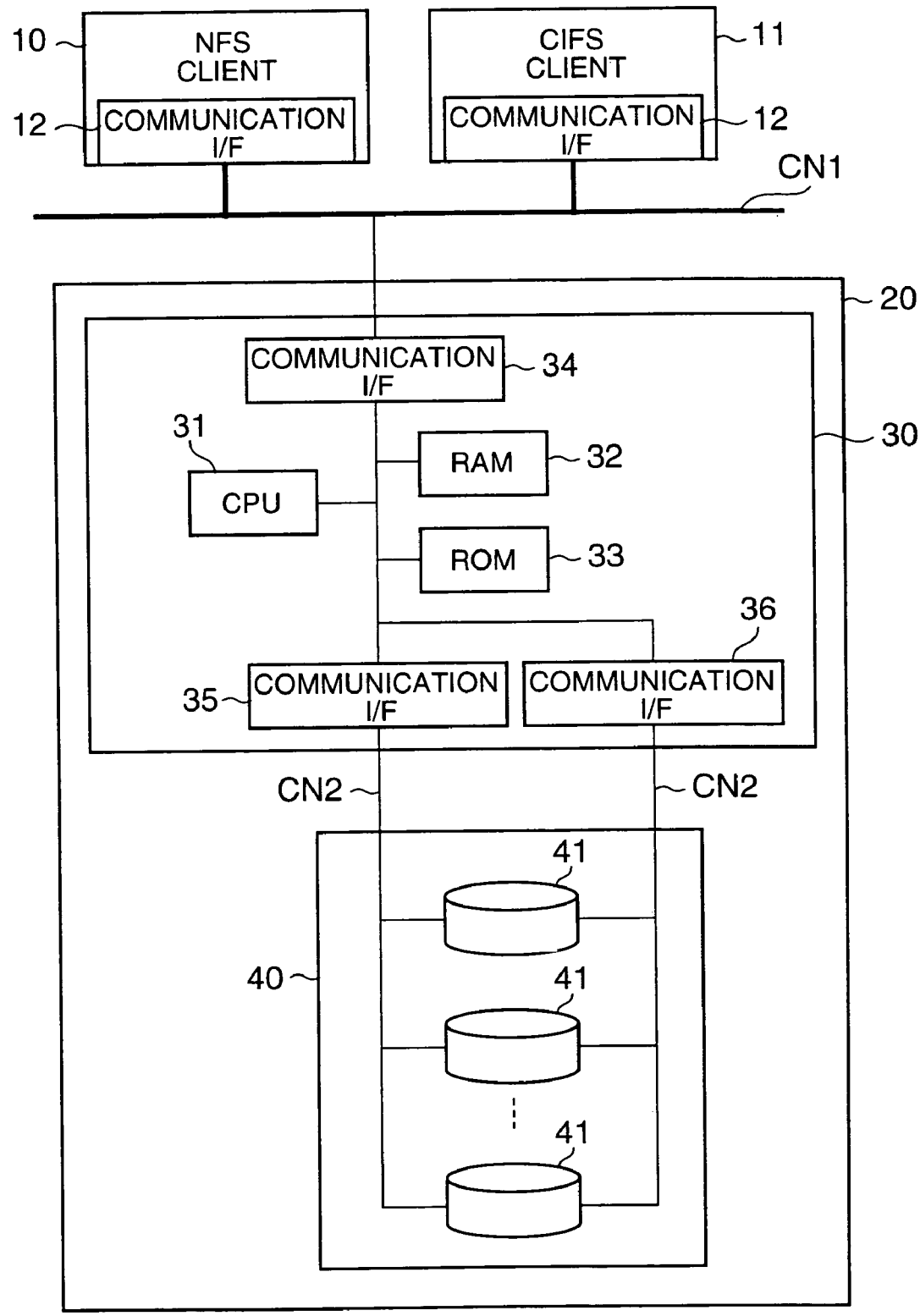
FIG. 3 is a schematic block diagram in which the focus is on the hardware structure of the network storage device.

FIG. 3 is a schematic block diagram in which the focus is on the hardware constitution of the network storage system. The network storage system can be constituted comprising a plurality of clients 10, 11, a network storage device 20, and a communication network CN1 that mutually connects the network storage device 20 and the respective clients 10 and 11, as described subsequently.

The clients 10 and 11 are programs installed on a computer device for using file sharing services (NAS services) provided by the network storage device 20. Here, for example, the client 10 is an NFS (Network File System, registered trademark) client that provides an NFS on a UNIX (registered trademark) OS. Further, the client 11 is a CIFS (Common Internet File System, registered trademark) client that provides a CIFS on a Windows (registered trademark) OS, for example. NFS and CIFS are file access protocols that run on TCP/IP (Transmission Control Protocol/Internet Protocol), for example.

The network storage device 20 is constituted as NAS, for example, and is compatible with many types of file access protocol such as NFS and CIFS. The network storage device 20 comprises a control unit 30 also called a 'NAS head' or similar, and a storage unit 40. The control unit 30 can be constituted comprising a CPU (Central Processing Unit) 31, a RAM (Random Access Memory) 32, a ROM (Read Only Memory) 33, and communication interfaces ('communication I/F' hereinbelow) 34 to 36, for example. The communication I/F 34 is an upper communication I/F that sends and receives data to and from the clients 10 and 11 via the communication network CN1, which is a LAN or the like, for example. The communication I/F 35 and 36 are lower communication I/F that send and receive data to and from the storage unit 40 via SAN (Storage Area Network) or other communication networks CN2, for example.

The control unit 30 parses commands received from the respective clients 10 and 11 and accesses the storage unit 40 in accordance with the content of the commands. The control unit 30 sends a file that is read from the storage unit 40 to the clients 10 and 11 respectively. Further, the control unit 30 rewrites all or part of the file read from the storage unit 40 and then stores this (partial) file in the storage unit 40.

The storage unit 40 comprises a plurality of storage devices 41. Each of the storage devices 41 can be constituted as a hard disk drive, semiconductor memory device, optical disk drive, or the like, for example. Each of a plurality of communication networks CN2 is connected to the respective storage devices 41. Even when damage to one communication network CN2 occurs, the storage device 41 can be accessed via another communication network CN2. Further, a plurality, such as three, four, or five of the storage devices 41, for example, can constitute one RAID (Redundant Array of Independent Disks) group. At least one or more logical volumes can be formed in each RAID group. That is, a logical volume (Logical Unit: 'LU' hereinbelow), which is a logical storage region, is formed in the physical storage region provided by each of the storage devices 41.

Further, although a case where the storage unit 40 is provided in the network storage device 20 is shown in FIG. 3, the constitution may be such that all or part of the storage unit 40 is provided outside the housing of the network storage device 20. For example, a disk array device constituted having a multiplicity of storage devices arranged as an array can also be used as the storage unit 40.

Figure 4:
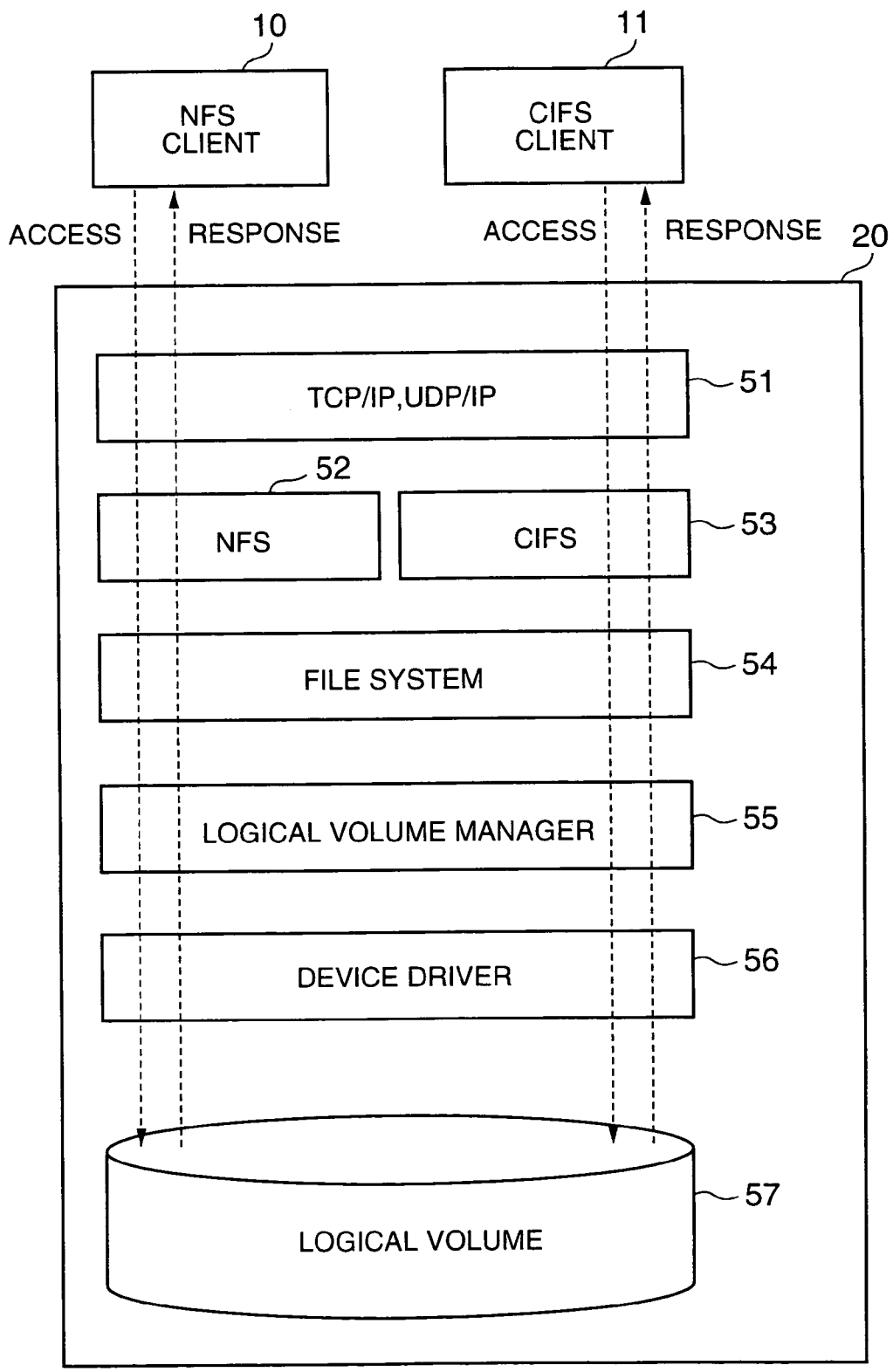
FIG. 4 is a schematic block diagram in which the focus is on the software structure of the network storage device.

FIG. 4 is a schematic block diagram in which the focus is on the software constitution of the network storage system. The network storage device 20 can be constituted comprising a network protocol layer 51, file access protocol layers 52 and 53, a file system 54, a logical volume manager (hereinafter 'LVM') 55, a device driver group 56, and a plurality of LU 57 (only one of which is illustrated), for example.

The network protocol layer 51 supports a protocol such as TCP/IP or UDP/IP (User Datagram Protocol/Internet Protocol), for example, and sends and receives data in accordance with these protocols. The file access protocol layers 52 and 53 support a protocol for file access. For example, one file access protocol 52 is NFS, while the other file access protocol 53 is CIFS.

The file system 54 is a program for controlling the inputting/outputting of files to each LU 57, and forms a file tree in each LU 57. Except for a case where access restrictions have been set, each file tree can be supplied to each client 10, 11.

The LVM 55 is a program that provides a management function for the LU 57. The LVM 55 governs a plurality of LU 57 and divides same into volumes with a user-friendly capacity, for example. Further, the LVM 55 can also comprise a snapshot function. A 'snap-shot' is a still image of the data at a certain point in time. A 'snap-shot function' is a function that provides the storage constitution at the time the snapshot is created as a virtual volume. The device driver group 56 supplies data in a special file format in order to allow the LU 57, which is a storage access unit, to access the upper LVM 55.

The file system 54 receives a command that reveals the directory name and file name from the clients 10 and 11. The file system 54 converts the files requested by the clients 10 and 11 to volume position information on the basis of the received command. Volume position information is constituted by the number of the volume where the file data is present, segment information, and so forth, for example. The file system 54 converts an access-target file to volume position information and requests data access to the LVM 55. Upon receipt of the access request from the file system 54, the LVM 55 converts the access request to a block address in the LU 57 and transfers the block address to the device driver group 56. The device driver group 56 accesses the LU 57 on the basis of the block address thus received from the LVM 55 and reads the data of the file. The file data thus read is stored temporarily in the RAM 32 of the network storage device 20 and sends the file data to the clients 10 and 11.

Figure 5:
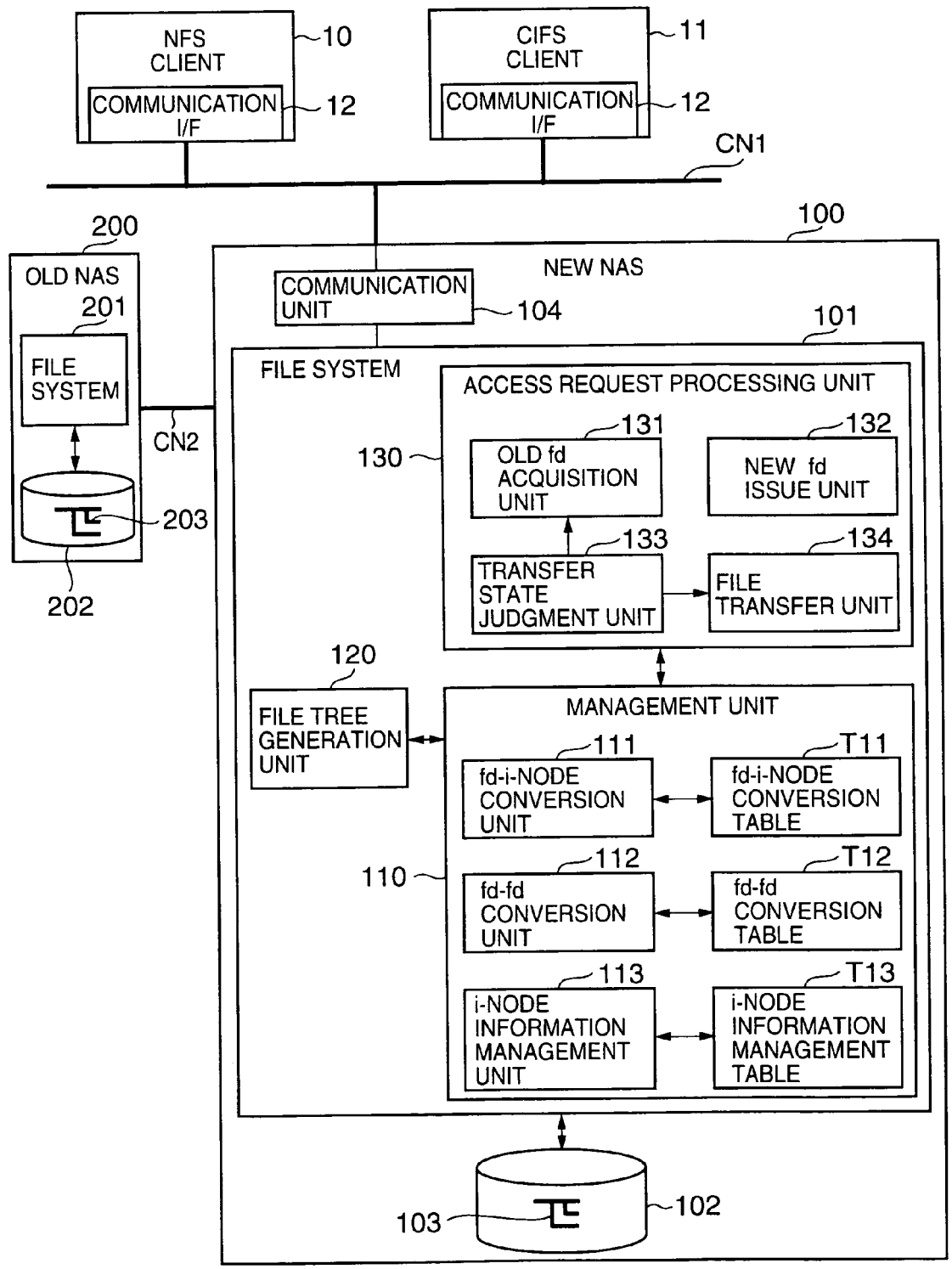
FIG. 5 is a schematic block diagram showing the overall structure of the network storage system.

Next, FIG. 5 is a schematic block diagram in which the focus is on the functional constitution of the network storage system. The network storage system comprises a plurality of clients 10 and 11, a newly installed network storage device 100 (the 'new NAS 100' hereinbelow), a network storage device 200 that is already installed ('old NAS 200' hereinafter), and a communication network CN1 such as a LAN.

Each of the NAS 100 and 200 can be provided with a constitution such as that shown in FIGS. 3 and 4. The respective NAS 100 and 200 need not have the same constitution. The old NAS 200 need only have the function of providing each of the clients 10 and 11 with NAS services. As will be described subsequently, each of the characteristic functions of the present embodiment is mounted in the new NAS 100. However, depending on the case, all or part of each characteristic function may be provided outside the new NAS 100.

The new NAS 100 can be constituted comprising a file system 101, an LU 102, and a communication unit 104, for example. Stated in more detail, the new NAS 100 also has constitution of an LVM and device driver group, as mentioned in conjunction with FIG. 4. In order to facilitate the description, the illustration will be omitted from FIG. 5. The file system 101 corresponds with the file system 54 in FIG. 4, the LU 102 corresponds with the LU 57 in FIG. 4, and the communication unit 104 corresponds with the network protocol layer 51 and file access protocol layers 52 and 53 in FIG. 4.

The internal functions of the file system 101 can be classified as a management unit 110, a file tree generation unit 120, and an access request-processing unit 130, for example.

The management unit 110 performs file tree management and can be constituted comprising an fd-i-node conversion unit 111, an fd-fd conversion unit 112, and an i-node information management unit 113, for example.

The fd-i-node conversion unit 111 is a function to convert the file descriptor fd received from the client into an i-node number. The fd-i-node conversion unit 111 is able to convert the inputted file descriptor fd into an i-node number by referencing an fd-i-node conversion table T11, for example. Conversion is not limited to this conversion, however. For example, when the i-node number can be calculated from the fd, the fd-i-node conversion table T11 may be abolished and the file descriptor fd may be converted into an i-node number within the fd-i-node conversion unit 111.

The fd-fd conversion unit 112 functions to convert the file descriptor fd (new) issued by the new NAS 100 into a file descriptor fd (old) issued by the old NAS 200. In FIG. 4, the file descriptor issued by the new NAS 100 is shown as 'new fd' and the file descriptor issued by the old NAS 200 is displayed as 'old fd'. The fd-fd conversion unit 112 converts the new fd to the old fd by referencing an fd-fd conversion table T12, for example. If necessary, the old fd can also be converted to the new fd. As will be mentioned subsequently, only the parts of the fd-fd conversion table T12 that relate to the old fd are generated first when a file tree is transferred from the old NAS 200 to the new NAS 100. Further, after NAS services have been restarted, the remaining parts of the fd-fd conversion table T12 are gradually generated stepwise in accordance with file access performed by the clients 10 and 11.

The i-node information management unit 113 manages each i-node information item. The i-node (i-node information) is information indicating the file attributes that are supplied to each of the files (directories). In the case of UNIX (registered trademark), there are cases where directories are also handled as files. The i-node numbers, which become an i-node key, are integer values for identifying a file on the file system. The storage position of each file on the actual volume 102 is specified by an i-node number. i-node information can include the owner of the file (or directory), the file size, the file storage address, and file (directory) attribute information such as the classification of the file or directory (information indicating whether the file or directory is the final file or directory of the tree), for example. The i-node information management unit 113 is able to register the acquired attribute information in the i-node information management table T13.

The file tree generation unit 120 generates a file tree for each LU 102. Further, the file tree generation unit 120 has a function to form a file tree with the same structure as that of the file tree of the old NAS 200 in the LU 102 of the new NAS 100.

The access request processing unit 130 processes file access requests from clients. The access request processing unit 130 can be constituted comprising an old fd acquisition unit 131, a new fd issuing unit 132, a transfer state judgment unit 133, and a file transfer unit 134, for example. The old fd acquisition unit 131 acquires the old fd issued by the old NAS 200 for the object file, from the old NAS 200. The new fd issuing unit 132 issues the new fd of the file or directory in response to access by the client and communicates the new fd to the client. The transfer state judgment unit 133 performs management to determine whether the file data (file substance) has been transferred from the file tree of the old NAS 200 to the file tree of the new NAS 100. The file transfer unit 134 acquires untransferred file data from the old NAS 200 and stores the acquired file data in a predetermined location in the file tree that corresponds with the file tree of the old NAS 200.

The file tree generation unit 120 and access request processing unit 130 access the management unit 110 as required, acquire information from the respective tables T11 to T13, and register the information in the respective tables T11 to T13. Further, the above function classification is merely an example and the present invention is not limited to or by this classification.

The old NAS 200 comprises a file system 201 and an LU 202. The other functions will not be described or illustrated here. The old NAS 200 is network storage device that is operated from before the new NAS 100 is introduced, and a multiplicity of file groups used by the respective clients 10 and 11 are stored in the LU 202. Prior to the introduction of the new NAS 100, the old NAS 200 supplies NAS services to the respective clients 10 and 11 via the communication network CN1.

When the new NAS 100 is introduced, the network configuration information of the old NAS 200 is handed over to the new NAS 100. The old NAS 200 is then disconnected from the communication network CN1 and directly connected to the new NAS 100 via the communication networks CN2.

Figure 6:
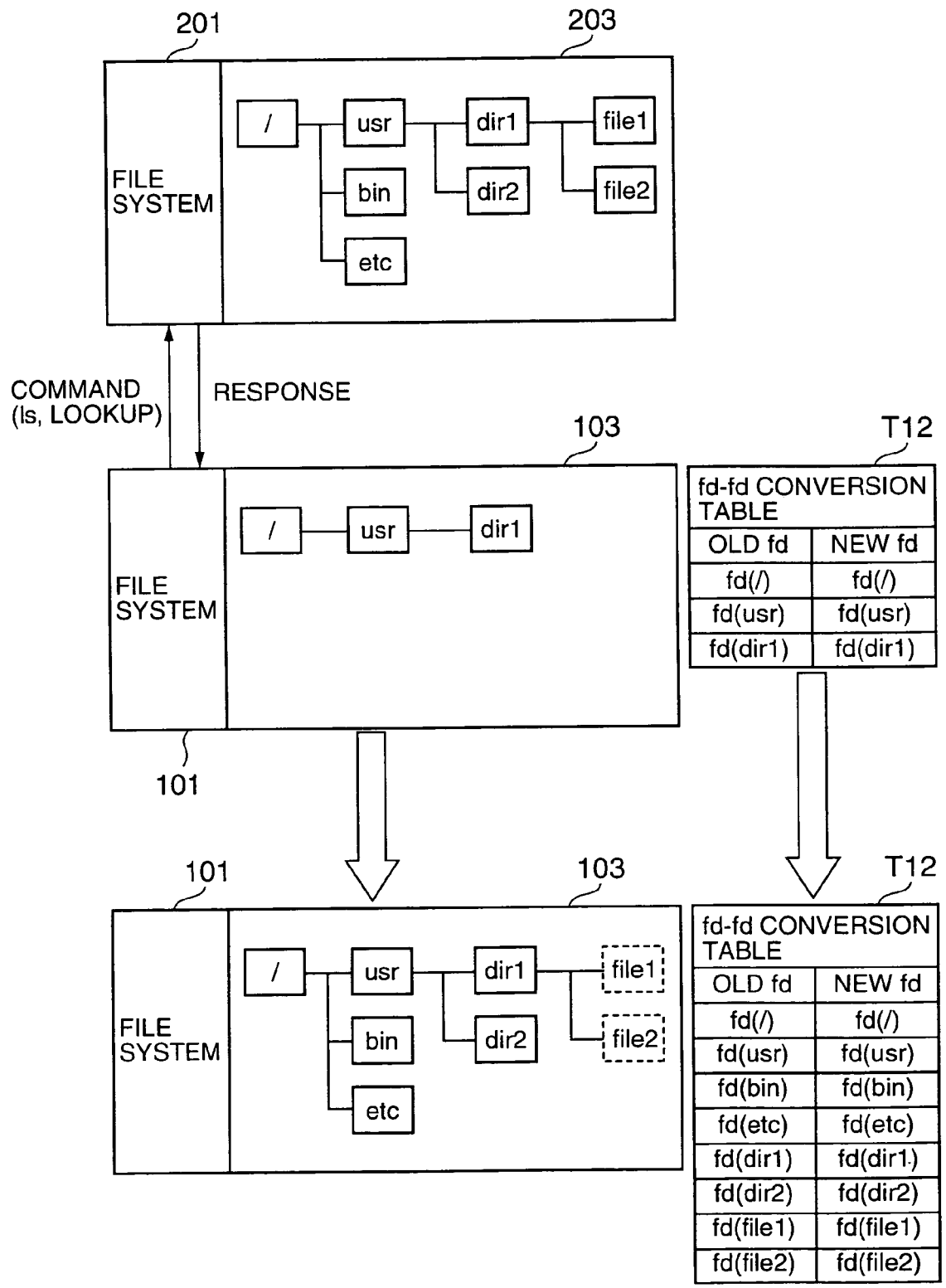
FIG. 6 is an explanatory view that schematically shows an aspect in which an old NAS file tree is transferred to a new NAS.

FIG. 6 is a schematic diagram showing an aspect in which a file tree structure is copied from the old NAS 200 to the new NAS 100. As shown toward the top of FIG. 6, the file system 201 of the old NAS 200 uses a file tree 203 to process a request to access the file.

In cases where a file 103 with the same structure as that of file tree 203 of the old NAS 200 is generated in the new NAS 100, the file system 101 of the new NAS 100 sends a predetermined command to the file system 201 of the old NAS 200. The file system 101 of the new NAS 100 constructs a file tree 103 on the basis of a response from the file system 201 of the old NAS 200.

For example, by sending a LOOKUP command and ls command to the file system 201 of the old NAS 200, the file system 101 of the new NAS 100 follows the hierarchical directory structure downward from the root directory ("/") of the file tree 203 of the old NAS 200. As shown in FIG. 6A, a file tree 103 is partially constructed in the new NAS 100. The file tree 103 mutually associates positional relationships of file-data storage locations and file data is not copied at this stage.

As shown in table T12 in FIG. 6A, in the process of copying the file tree structure while following the structure of the file tree of the old NAS 200 from the upper directory toward the lower directory, the old fd managed by the file system 201 of the old NAS 200 and the new fd that is managed by the file system 101 of the new NAS 100 can be associated and managed. Strictly speaking, the new fd and old fd are not directly associated. Instead, an association between the new fd and old fd can be achieved via an i-node number that corresponds one-to-one with the new fd.

That is, in the process of copying the file tree structure, the old fd is acquired from the file system 201 of the old NAS 200 and the file system 101 of the new NAS 100 allocates an i-node number to each of the constituent elements of the file tree. The i-node number corresponds one-to-one with the new fd issued by the file system 101. Therefore, in the process of copying a file tree structure, the old fd and new fd can be associated indirectly by associating the old fd with the i-node number. The method for first associating the old fd and i-node number will be described further in another embodiment example.

The association between the old fd and new fd can also be executed when the file tree structure is transferred. Thereafter, after the transfer of the file tree structure is complete, the new fd can also be associated in accordance with file access by the client.

As shown in FIG. 6B, before long, the file tree 103, which has the same structure as that of the file tree 203 of the old NAS 200 is constructed on the new NAS 100. The association of the old fd and new fd (i-node number) is also completed at the same time. However, as mentioned earlier, a variety of modified examples exist for the method of constructing associations between the old fd and new fd.

The file tree structure that is copied from the old NAS 200 to the new NAS 100 shows file storage locations and therefore file data is not copied. This fact is indicated in FIG. 6 by drawing a broken line around 'file'.

Next, a file specification method employing i-node information will be described with reference to FIGS. 7 and 8. First, the file specification method that is run on the old NAS 200 will be described with reference to FIG. 7. An aspect in which the data of a file 'file1.txt' stored in directory 'dir1' is accessed will be described by way of example.

First, the i-node information of the root directory is referenced. In the illustrated example, i-node number '2' has been assigned to the root directory. In addition to attributes such as the owner of the root directory and the file size, a file address Adr1 is included in the i-node information for the root directory. The address Adr1 indicates the storage position in the LU 202 constituting the actual volume.

Figure 7:
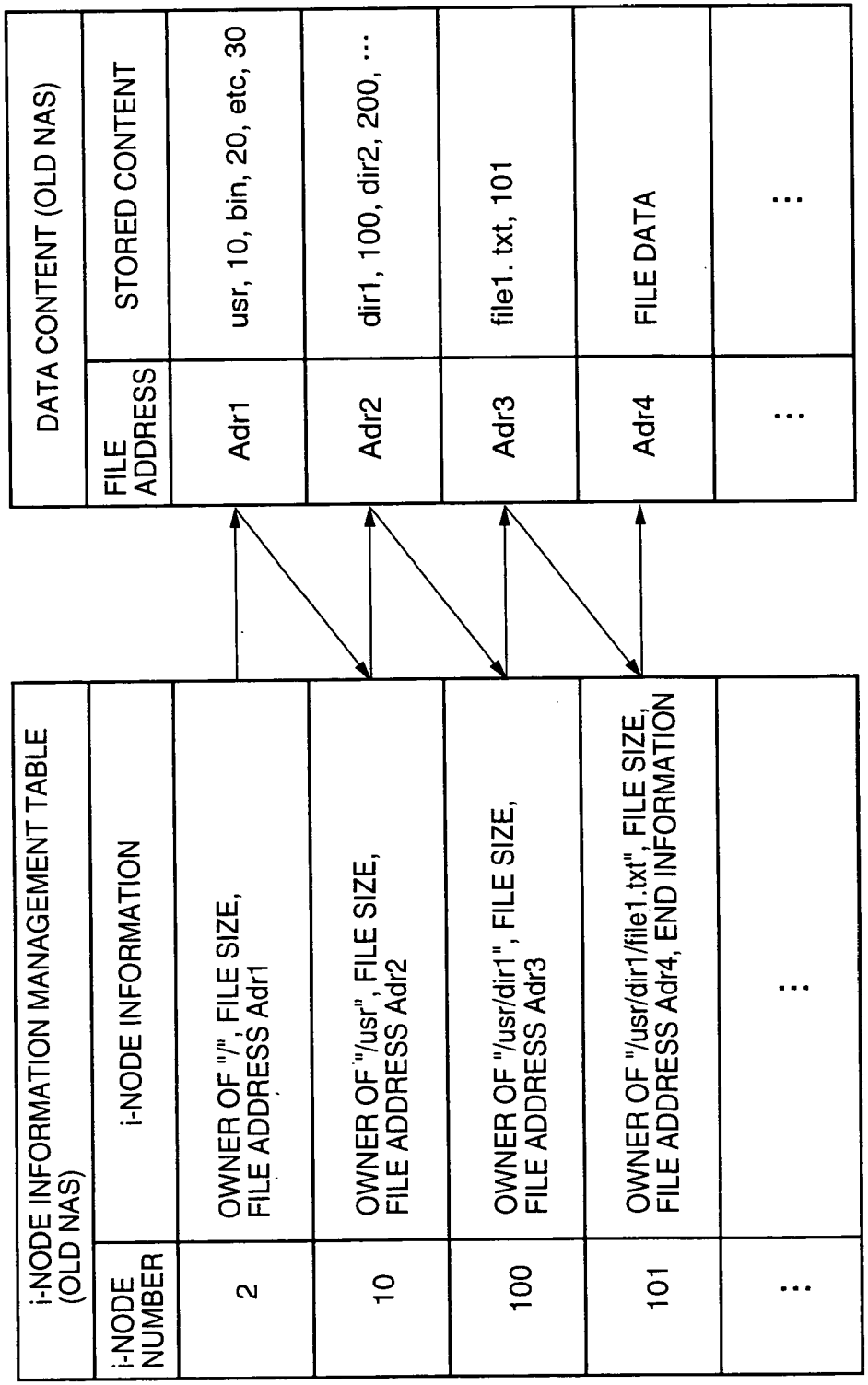
FIG. 7 is an explanatory view that shows an aspect in which file data in the old NAS is accessed by means of i-node information.

Therefore, as shown on the right-hand side of FIG. 7, the content of data stored at address Adr1 is referenced. The name of each directory contained in the root directory and the i-node number of the directories are stored at this address. More specifically, for example, 'usr, 10' indicates the directory 'usr' to which the i-node number '10' has been assigned. Similarly, 'bin, 20' indicates directory 'bin' to which the i=node number '20' has been assigned. Therefore, when 'usr, 10, bin, 20, etc, 30' appears as the data content of the root directory, this indicates that the directory 'usr' with i-node number '10', directory 'bin' of the i-node number '20', and directory 'etc' with i-node number '30' are provided below the root directory.

After directory 'usr' has been confirmed to exist below the root directory, i-node information with i-node number '10' is referenced. i-node number '10' is a number assigned to the directory 'usr' and a file address Adr2 is included in the i-node information. Accordingly, it can be seen that, when the data content that is stored at address Adr2 is referenced, two subdirectories 'dir1' and 'dir2' are contained in the directory 'usr'.

When the i-node information for subdirectory 'dir1' is referenced, a file address Adr3 is included in this i-node information. When the content of data stored at address Adr3 is referenced, it can be seen that the file 'file1.txt' is stored in 'dir1'. Therefore, the i-node information of the file is referenced with the i-node number '101' assigned to the file 'file1.txt' serving as a key. The file address Adr4 is included in the i-node information of file 'file1.txt'. Further, the i-node information also contains end information indicating that the i-node is the end of the file tree. The data of the file 'file1.txt' is stored in the address Adr4 and file data can be read from address Adr4. Thus, the object file can be accessed by following the i-node information management table sequentially from the root directory.

Figure 8:
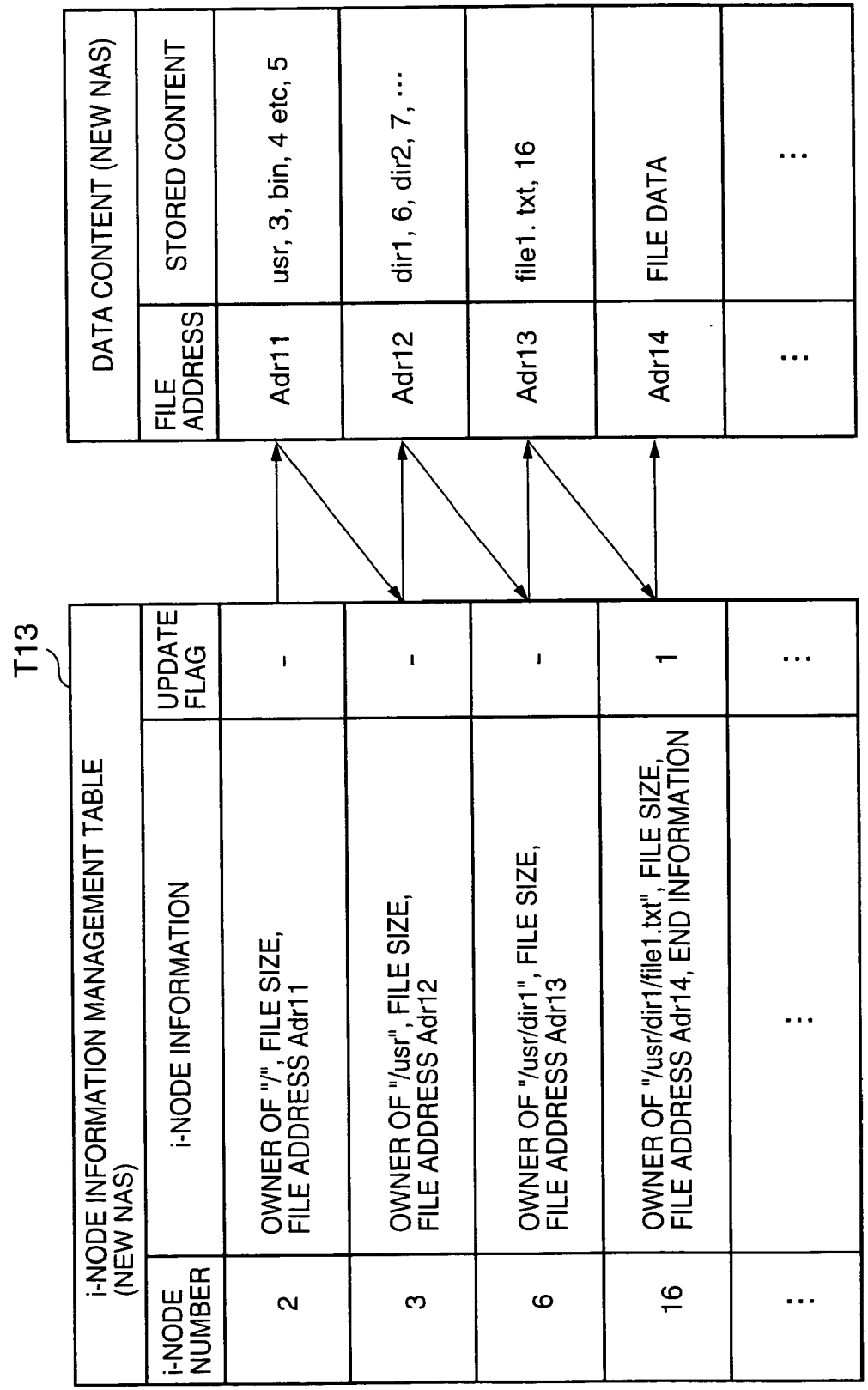
FIG. 8 is an explanatory view that shows an aspect in which file data in the new NAS is accessed by means of i-node information.

FIG. 8 shows the file specification method that is run on the new NAS 100. The i-node information management table shown in FIG. 7 and the i-node information management table T13 shown in FIG. 8 differ in three ways. The first difference is that the i-node numbers that are assigned to each of the constituent elements (file, directory) constituting the file tree are all different. Although i-node number '2' is assigned to the root directory in both the new and old NAS 100 and 200 respectively, different i-node numbers are assigned to files below the root directory (including directories). That is, the method of setting the i-node number differs for each file system.

The second difference lies in the fact that the storage addresses of the data content associated with each piece of i-node information differ between the new and old NAS 100 and 200 respectively.

The third difference lies in the fact that an update flag has been added to the i-node information management table T13 of the new NAS 100. The update flag is information indicating whether a file has been transferred to the LU 102 of the new NAS 100. The update flag can also be called 'transfer state information', 'transfer state judgment information', and so forth, for example. The update flag is not set for the i-node information of a directory. The update flag is set only for a file. When the update flag is '1', this indicates that the file has not been transferred to the new NAS 100. The third difference is one aspect of the special constitution of this embodiment. Further, the update flag need not necessarily be included in the i-node information management table T13 and may be associated with an i-node number.

Next, a constitutional example of the fd-i-node conversion table T11 and the fd-fd conversion table T12 will be described on the basis of FIG. 9. FIG. 9A shows the fd-i-node conversion table T11. A plurality of new fd issued by the new NAS 100 and i-node numbers associated with each of the new fd, for example, are stored in the fd-i-node information table T11.

FIG. 9B shows the fd-fd conversion table T12. The fd-fd conversion table T12 associates and stores the new fd issued by the new NAS 100 and the old fd issued by the NAS 200.

FIG. 9C shows a conversion table T11A that is produced by integrating the fd-i-node conversion table T11 and the fd-fd conversion table T12. The conversion table T11A associates the i-node number of the new NAS 100, the new fd, and the old fd. Two tables, which are the conversion table T11 and T12, may be used or the conversion table T11A alone may be used instead.

Next, the operation of the present embodiment will be described. According to this embodiment example an NFS case is described by way of example. Although commands and so forth differ somewhat in a CIFS case, the basic operation may be considered to be substantially the same.

Figure 10:
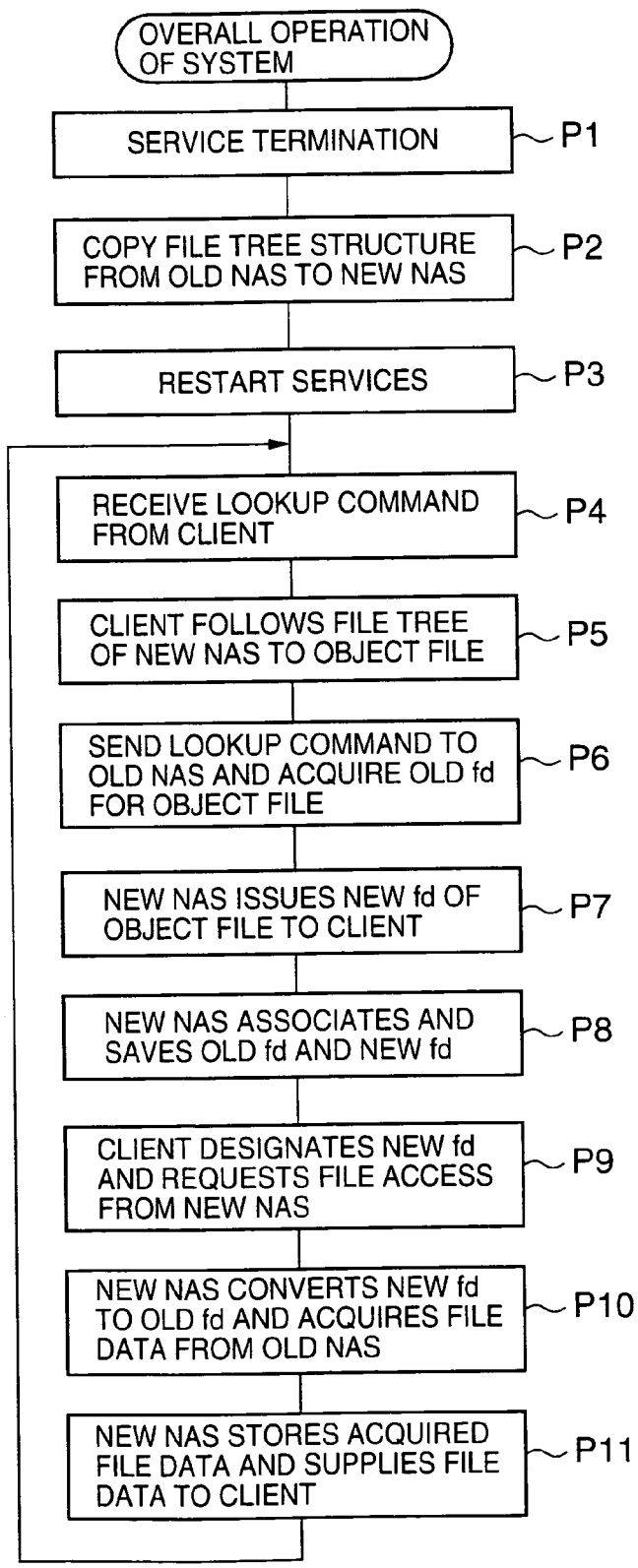
FIG. 10 is a flowchart providing an outline of the overall operation of the storage system.

First, FIG. 10 provides an outline of the overall operation of the storage system. The procedure from the termination of services by the old NAS 200 up until services by the new NAS 100 are restarted can be performed as follows, for example. The procedure will be described in more detail in FIG. 11 and subsequent drawings.

For example, after normal tasks are terminated such as at night or on holidays, the old NAS 200 terminates services (P1). Next, a file tree with the same structure as that of the file tree 203 of the old NAS 200 is copied to the new NAS 100 (P2). The new NAS 100 restarts the provision of the NAS services when copying of the file tree structure is complete (P3). The fact that NAS services can be restarted by the new NAS immediately after the copying of the file tree structure is complete constitutes one characteristic of the present invention.

The client (10, 11) accesses the new NAS 100. The new NAS 100 then receives a LOOKUP command from the client (P4). The client follows the file tree 103 of the new NAS 100 from the root directory downward (P5) while sending an ls command and LOOKUP command and so forth stepwise to the new NAS 100.

When the client finds the access target file, the new NAS 100 sends a LOOKUP command or similar to the old NAS 200 and acquires the old fd corresponding with the access target file from the old NAS 200 (P6). The new NAS 100 issues a new fd for the access target file and communicates the new fd to the client (P7). Further, the new NAS 100 associates and manages the new fd for the access target file and the old fd (P8).

The client designates the new fd and requests access to the file (P9). The new NAS 100 converts the new fd received from the client to the old fd and acquires file data from the old NAS 200 by using the old fd (P10). Further, the new NAS 100 stores the file data acquired from the old NAS 200 and provides the file data for access by the client (P11).

Figure 11:
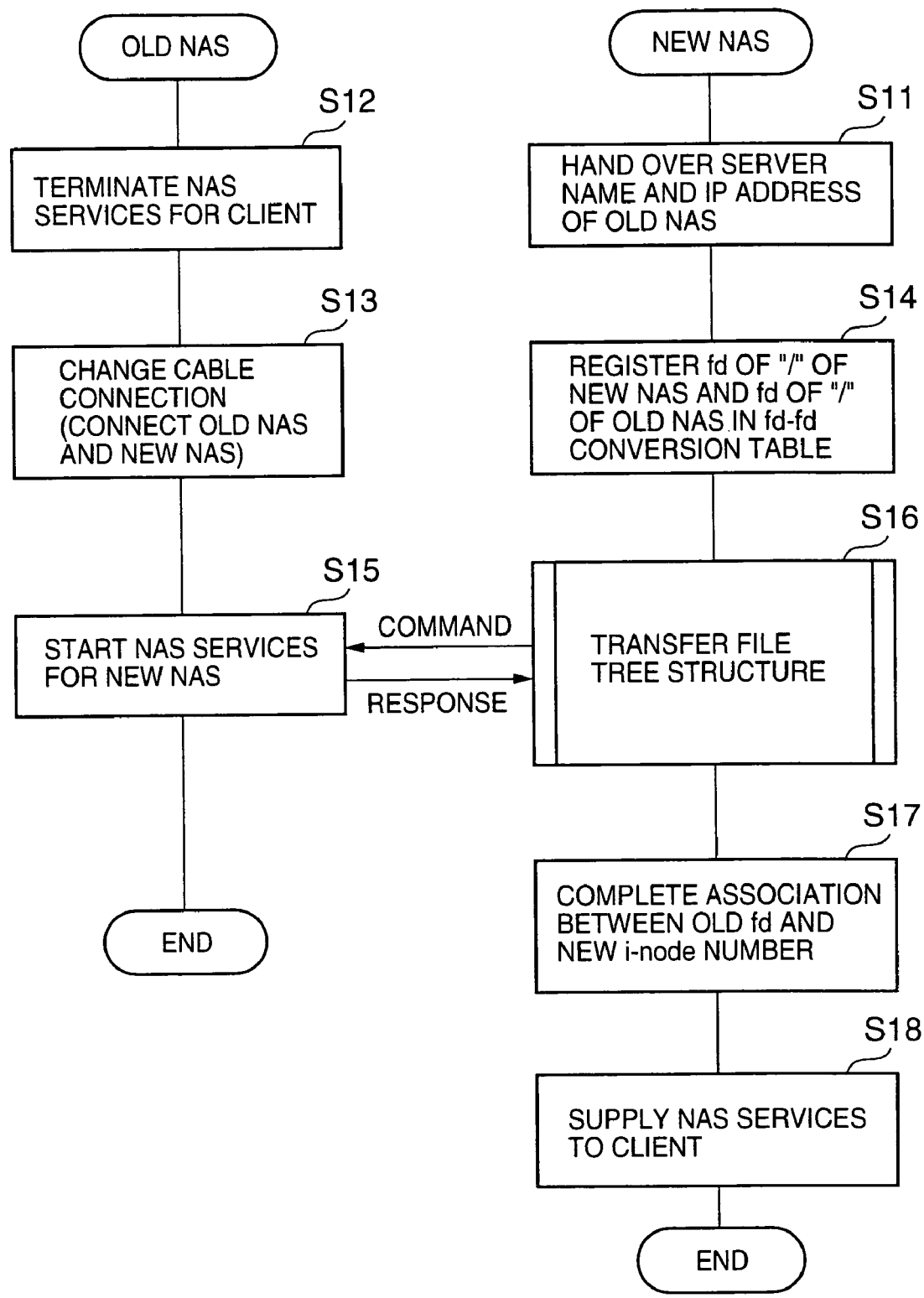
FIG. 11 is an outline flowchart showing a procedure in which a new NAS added to the network storage system is booted.

FIG. 11 is a schematic flowchart that shows processing corresponding to procedures P1 to P3 until the new NAS 100 that has been added to the network storage system is booted.

First, the system administrator or similar sets an IP address, server name, and the like that is set for the old NAS 200 as network configuration information for the new NAS 100 (S11). Next, the system administrator or similar terminates NAS services by the old NAS 200 (S12). The system administrator or similar switches the cable connection after terminating the NAS services by the old NAS 200 for the respective clients 10, 11 (S13).

That is, the system administrator or similar disconnects the old NAS 200 from the communication network CN1 and directly connects the old NAS 200 and new NAS 100 by means of the communication network CN2 (S13).

Next, file descriptors, which correspond with the root directory of the new NAS 100 and the root directory of the old NAS 200, are associated and registered in the fd-fd conversion table T12 (S14). That is, the file descriptor (new fd(root)) corresponding with the root directory of the new NAS 100, and the file descriptor (old fd (root)) corresponding with the root directory of the old NAS 200 are associated and registered in the fd-fd conversion table T12.

The system administrator or similar starts the processing to transfer the file tree structure. Further details of the processing to transfer the file tree structure will be provided subsequently. To first provide a simple outline of this processing, the old NAS 200 provides the new NAS 100 with NAS services (S15). The new NAS 100 inquires after the structure of the file tree by sending a predetermined command to the old NAS 200. The new NAS 100 then generates a file tree with the same structure as that of the file tree of the old NAS 200 on the basis of the details of the response by the old NAS 200 (S16).

In the step of copying the file tree structure, the association between the old fd managed by the old NAS 200 and the i-node number managed by the new NAS 100 is also completed (S17). The new NAS 100 then starts providing services to clients when the copying of the file tree structure is complete. Because the network configuration information of the old NAS 200 is handed over to the new NAS 100, the client requests file access without being especially aware of the switch from the old NAS 200 to the new NAS 100.

Therefore, the period of NAS service termination from the perspective of the respective clients 10 and 11 is a period from the instant the NAS services are terminated in S11 until the instant NAS services are restarted in S18. That is, in essence, NAS services for each of the clients 10 and 11 are restarted when the transfer of the file tree from the old NAS to the new NAS 100 is complete. However, the new NAS 100 does not store files stored by the old NAS 200 when the provision of NAS services by the new NAS 100 to the clients 10 and 11 is started. As described subsequently, when the respective clients 10 and 11 request file access to files stored on the old NAS 200, the required files are transferred from the old NAS 200 to the new NAS 100 file by file in accordance with this file access.

Therefore, according to the present embodiment, NAS services are immediately restarted at a stage in which only the file tree structure of the old NAS 200 is first transferred to the new NAS 100. Thereafter, only the required files are transferred from the old NAS 200 to the new NAS 100 in accordance with access requests from the respective clients 10 and 11.

An example of processing to transfer the file tree structure will be described with reference to FIGS. 12 to 14. In the following description, a case in which a file (/root/usr/dir1/file1.txt) stored in the old NAS 200 is transferred to the new NAS 100 is mainly described.

Figure 12:
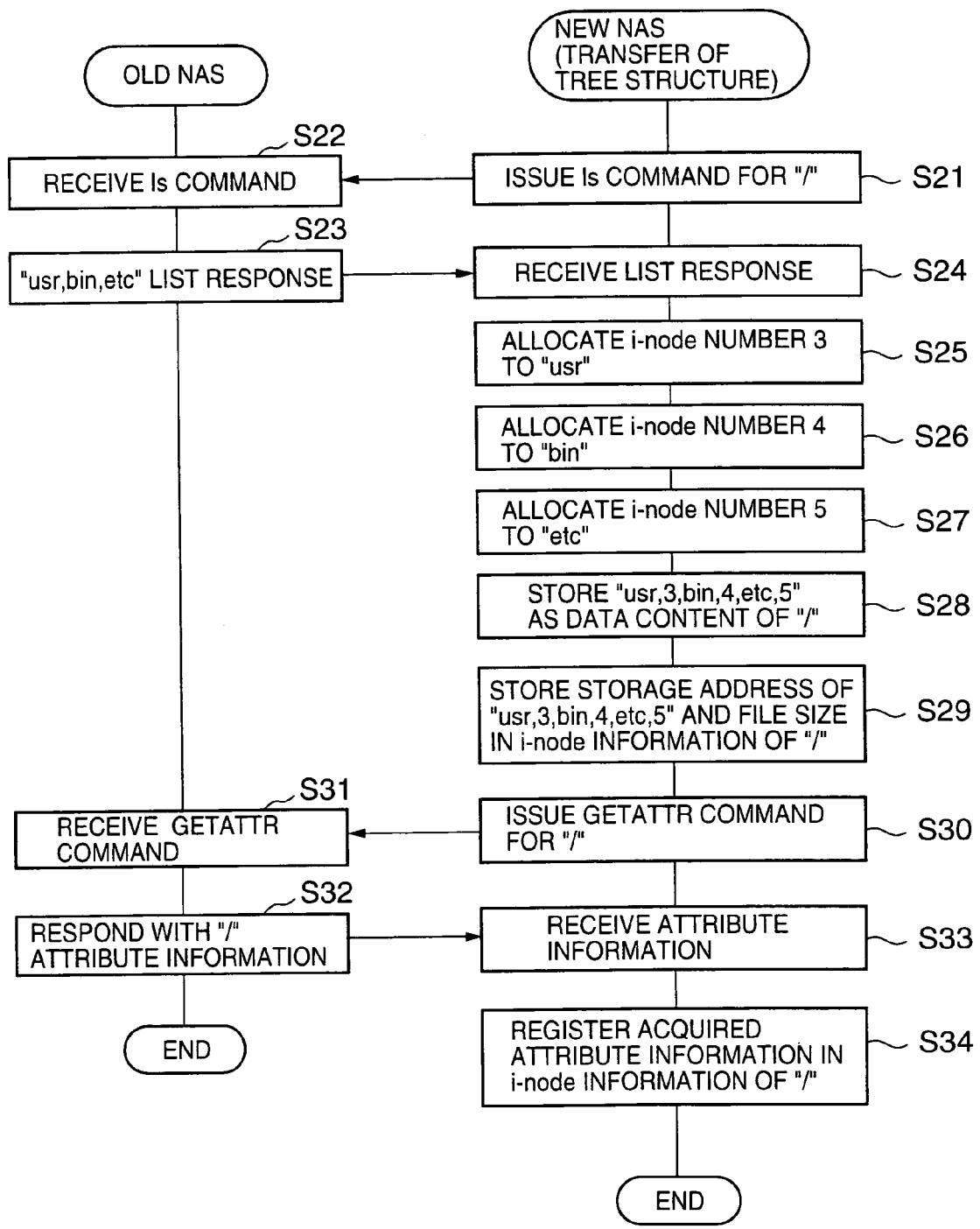
FIG. 12 is a flowchart showing an aspect in which a file tree with the same structure as that of the old NAS file tree is generated in the new NAS and shows an aspect in which the structure directly below the root directory is copied.

FIG. 12 shows an aspect in which three directories 'usr', 'bin', and 'etc' directly below the root directory are transferred from the old NAS 200 to the new NAS 100. First, the new NAS 100 issues an ls command to the old NAS 200

(S21) The ls command is a command that requests a list of files within a directory. That is, in S21, the root directory of the file tree 203 of the old NAS 200 is network-mounted, the ls command is issued, and the structure directly below the root directory is scanned. Further, in this specification, the issuing of an ls command means that the root directory of the old NAS 200 is network-mounted by the new NAS 100 and that the new NAS 100 issues an ls command to a specified directory.

When the old NAS 200 receives an ls command from the new NAS 100 (S22), notification of the fact that three directories 'usr', 'bin', and 'etc' exist directly below the root directory is sent to the new NAS 100 (S23).

When the new NAS 100 receives a list response from the old NAS 200 (S24), an i-node number is allocated to each of the three directories (S25 to S27). In this embodiment example, the i-node number '3' is allocated to 'usr' (S25), i-node number '4' is allocated to 'bin' (S26), and i-node number '5' is allocated to 'etc' (S27).

The new NAS 100 registers 'usr,3,bin,4,etc,5' in the i-node information management table T13 as the data content of the root directory (S28). Next, as also shown in FIG. 8, the new NAS 100 registers a storage address Adr11 at which 'usr,3,bin,4,etc,5' is stored and the file size of the root directory in the i-node information management table T13 as i-node information for the root directory (S29).

Next, the new NAS 100 issues a GETATTR command for the root directory to the old NAS 200 (S30). Here, the GETATTR command is a command that requests file attribute information. Upon receipt of the GETATTR command from the new NAS 100 (S31), the old NAS 200 reads the attribute information of the root directory and sends same to the new NAS 100 (S32).

Upon receipt of attribute information for the root directory from the old NAS 200 (S33), the new NAS 100 registers the attribute information in the i-node information management table T13 as i-node information for the root directory. Examples of attribute information of the root directory can include 'owner' or similar, for example. As a result of the above processing, a structure that is the same as that of the structure located directly below the root directory of the LU 202 is formed in the LU 102 of the new NAS 100.

Figure 13:
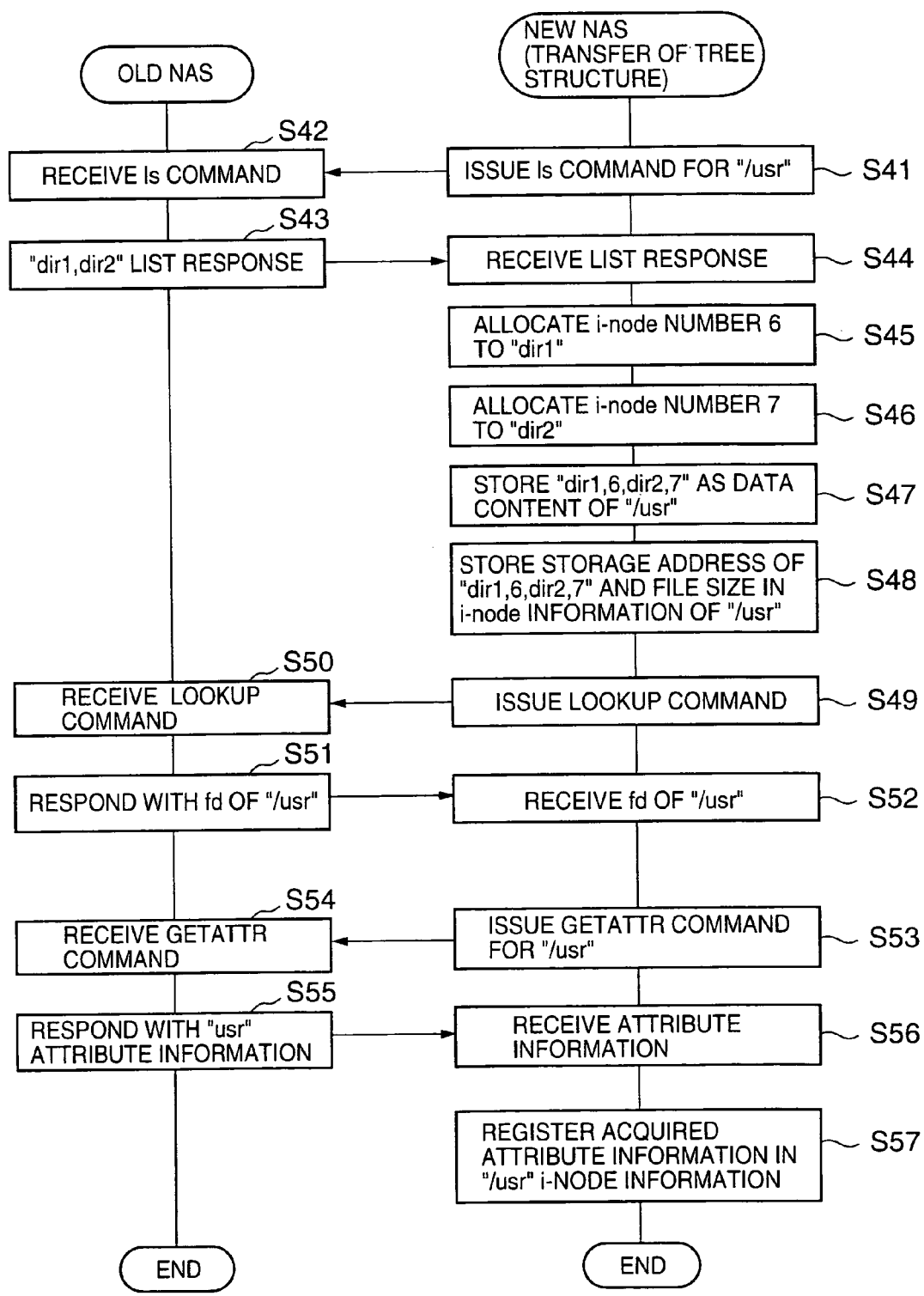
FIG. 13 is a flowchart showing a file tree transfer that is the same as that in FIG. 12 that shows an aspect in which the directory structure is copied.

FIG. 13 is a flowchart showing processing in a case where the structure of the directories directly below the root directory is copied. This processing is performed in substantially the same manner as the processing that appears in FIG. 12. First, the new NAS 100 issues an ls command for the directory 'usr' to the old NAS 200 (S41). Upon receiving the ls command from the new NAS 100 (S42), the old NAS 200 sends a list (dir1, dir2) of files contained in the directory to the new NAS 100 (S43) Upon receiving the list response from the old NAS 200 (S44), the new NAS 100 allocates the i-node number '6' to the subdirectory 'dir2' (S45), and allocates the i-node number '7' to the subdirectory 'dir2' (S46). The new NAS 100 then registers 'dir1,6,dir2,7' as the data content of the directory 'usr' (S47).

In addition, the new NAS 100 stores the storage address Adl2 for 'dir1,6,dir2,7' and the file size in the i-node information management table T13 as i-node information for directory 'usr' (S48). Next, the new NAS 100 issues a LOOKUP command for 'usr' to the old NAS 200 (S49). Here, the LOOKUP command is a command to acquire a file descriptor.

Upon receiving the LOOKUP command from the new NAS 100 (S50), the old NAS 200 sends the file descriptor (old fd (usr)) associated with the directory 'usr' to the new NAS 100 (S51)

However, in cases where information on the old fd (usr) can be obtained on the new NAS 100 from the results of the previously executed 'ls' command, this procedure may be omitted. Thereafter, in this specification, in cases where information on the old fd of the specified directory is obtained from the results of the 'ls' command run beforehand, the procedure that issues the LOOKUP command on the new NAS 100 can be omitted.

Upon receiving the file descriptor for 'usr' from the old NAS 200 (S52), the new NAS 100 issues a GETATTR command for the directory 'usr' by using the file descriptor (S53).

Upon receiving the GETATTR command from the new NAS 100 (S54), the old NAS 200 reads the 'usr' attribute information and sends same to the new NAS 100 (S55).

Upon acquiring the attribute information for the directory 'usr' from the old NAS 200 (S56), the new NAS 100 registers the attribute information in the 'usr' field of the i-node information management table T13 (S57). As mentioned earlier, the content of each of the directories 'usr', 'bin' and 'etc' that belong directly below the root directory can be acquired from the old NAS 200 and registered in the i-node information management table T13 of the new NAS 100. The same method as that shown in FIG. 13 may also be executed in cases where the respective directories 'dir1' and 'dir2' are registered. The file tree structure of the old NAS 200 may be transferred to the new NAS 100 as a result of i-node information being registered in the i-node information management table T13.

Figure 14:
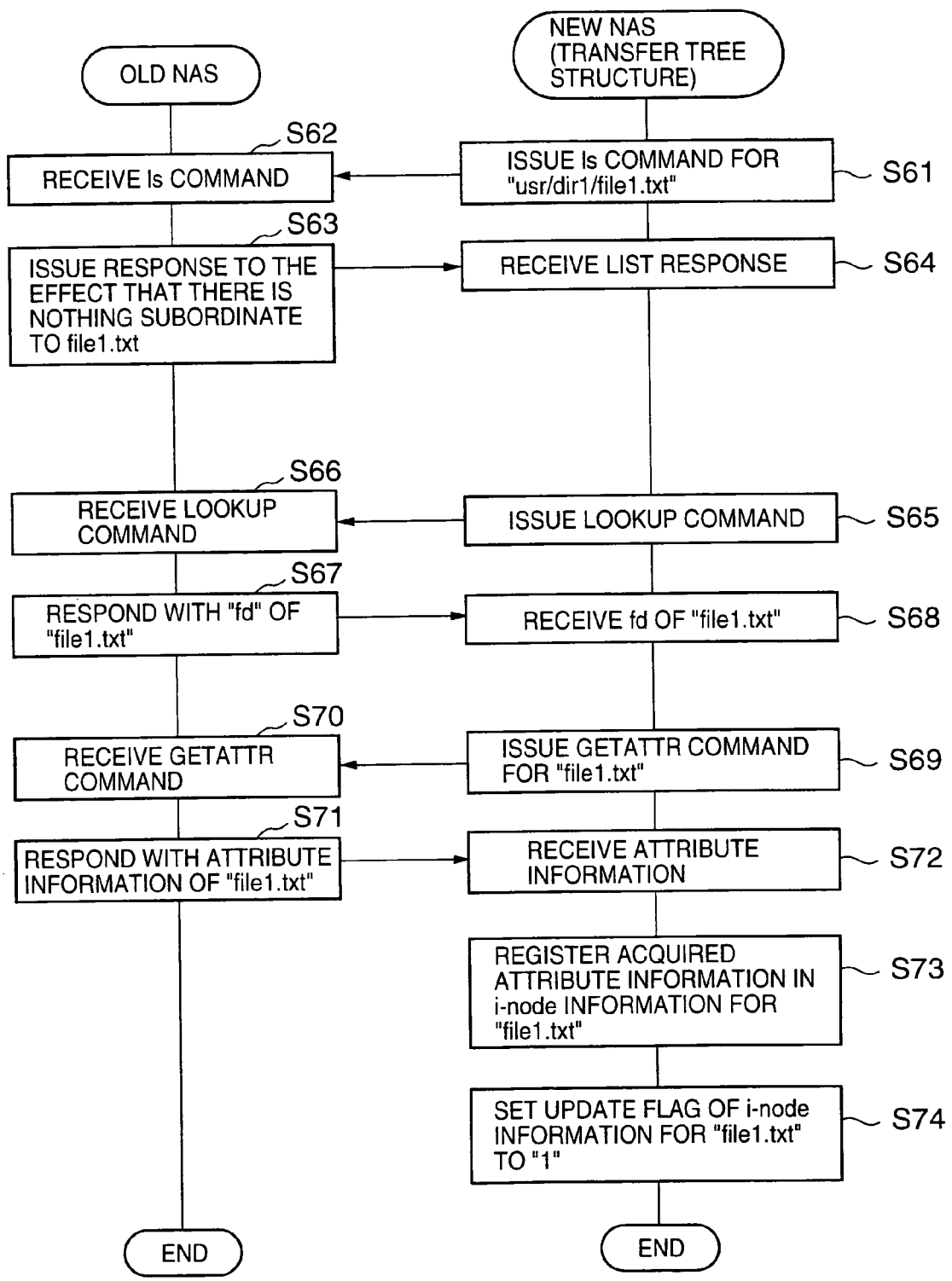
FIG. 14 is a flowchart showing a file tree transfer that is the same as that in FIG. 12 that shows an aspect in which the file structure is copied.

FIG. 14 is a flowchart for a case where i-node information for the file 'file1.txt' stored in the subdirectory 'dir1' is registered in the i-node information management table T13. In the flowchart, only the i-node information for the file is generated in the new NAS 100. The substance of the file (file data) is not transferred to the new NAS 100. As will be described subsequently, the transfer of the file data is executed in cases where an access request from the respective clients 10 and 11 is produced.

First, the new NAS 100 issues an ls command for the file '/usr/dir1/file1.txt' (S61). That is, the new NAS 100 issues an inquiry to the old NAS 200 with regard to elements (files, directories, and so forth) belonging to the file 'file1.txt'.

Upon receipt of the ls command from the new NAS 100 (S62), the old NAS 200 issues a response to the effect that there is nothing subordinate to the file 'file1.txt' (S63). This is because the file 'file1.txt' is one of the ends of the file tree and hence no other files or the like exist below this file.

Upon receipt of the response from the old NAS 200 (S64), the new NAS 100 issues a LOOKUP command for the file 'file1.txt' (S65). Upon receipt of the LOOKUP command (S66), the old NAS 200 sends the old fd (file1.txt) of the file 'file1.txt' to the new NAS 100 (S67).

Upon receipt of the old fd (file1.txt) (S68), the new NAS 100 uses the fd (file1.txt) to issue a GETATTR command for the file 'file1.txt' (S69). Upon receiving the GETATTR command from the new NAS 100 (S70), the old NAS 200 reads attribute information relating to the file 'file1.txt' and sends the attribute information to the new NAS 100 (S71).

Upon receipt of the attribute information on the file 'file1.txt' (S72), the new NAS 100 registers the attribute information as i-node information for the 'file1.txt' in the i-node information management table T13 (S73).

Further, the new NAS 100 sets the update flag corresponding with the file 'file1.txt' to '1' (S74). Because an 'untransferred state' exists in cases where the substance of the file data has not been copied to the new NAS 100, '1' is set for the update flag.

As shown in FIGS. 12 to 14, a file tree with the same structure as that of the file tree of the old NAS 200 is initially formed in the new NAS 100. At this stage, the substance of each file is not copied to the new NAS 100 and exists only in the old NAS 200.

Figure 15:
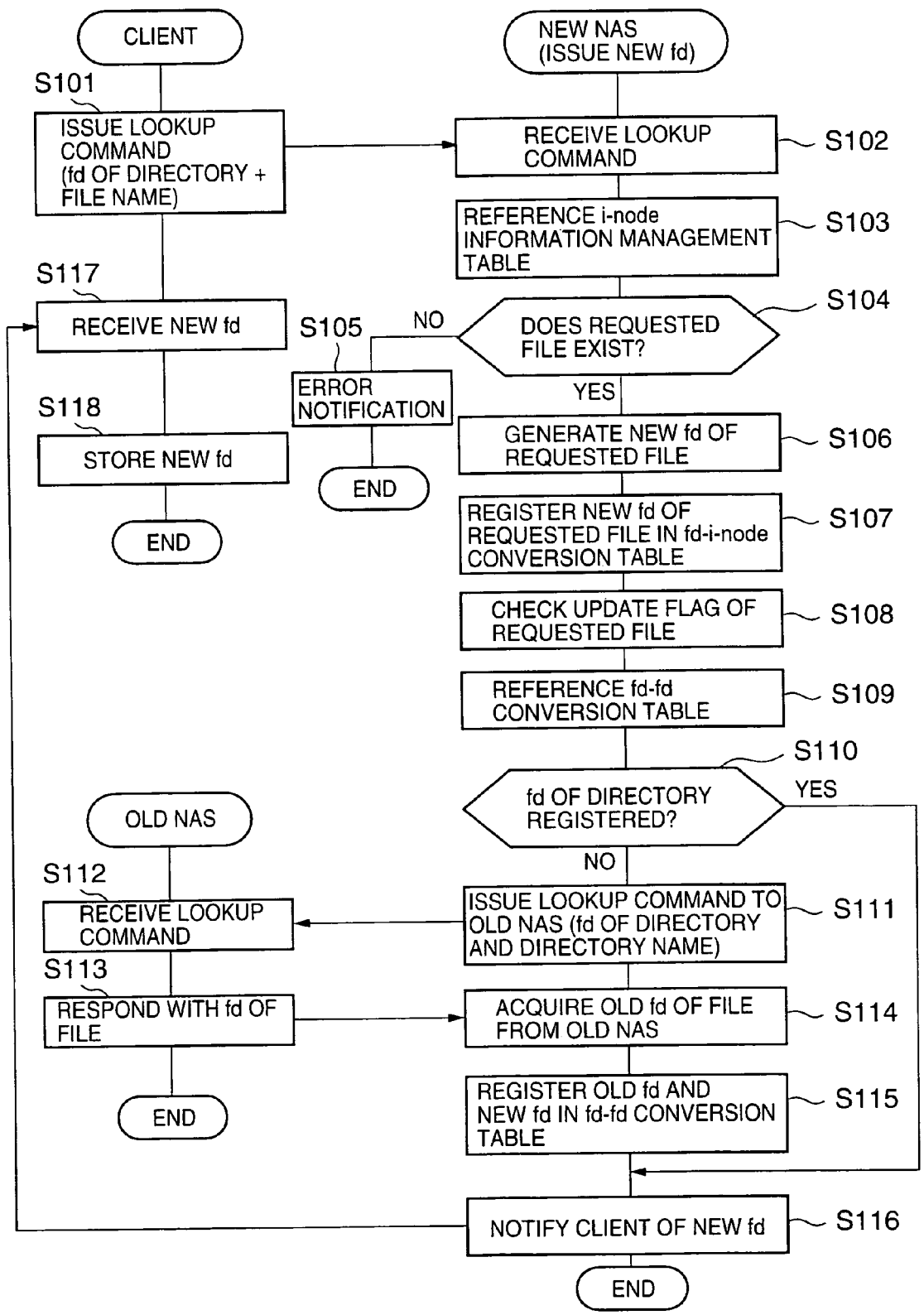
FIG. 15 is a flowchart showing an aspect in which a new file descriptor is issued to the client by the new NAS.

FIG. 15 is a flowchart showing an outline of the processing when the respective clients 10 and 11 acquire a new fd from the new NAS 100. Further, because there is no need for a particular distinction between the operations of the client 10 and client 11, same appear as 'clients 10, 11'.

If an outline of the processing is to be provided first, when the clients 10, 11 access a file or directory, the clients 10, 11 use the LOOKUP command to acquire the new fd of the access target file from the new NAS 100 and then issue an update request (write access) or reference request (read access) or similar by using the new fd. If the access target file is located on a deep level, the clients 10, 11 use the fd of the lowest directory that same have been able to acquire and issue a LOOKUP command. The clients 10, 11 sequentially follow the hierarchical directory structure to the object file while designating the fd corresponding with the lowest path currently identified and the directory or file name belonging to the lowest path, for example, and thus obtain the new fd of the object file from the NAS 100.

Let us now return to FIG. 15. First, the clients 10, 11 designate, with respect to the new NAS 100, the file descriptor of the directory and the desired file name belonging to the directory and then issue the LOOKUP command (S101). In FIG. 15, the new fd of the directory in which the object file is stored is illustrated as being obtained by the clients 10, 11. In cases where the fd of the directory or the like where the object file is stored is unknown, the clients 10, 11 obtain the new fd of the directory to which the file directly belongs while sequentially following the file tree 103 of the new NAS 100 from the root directory toward the lower directories as mentioned earlier.

Upon receipt of the LOOKUP command from the clients 10, 11 (S102), the new NAS 100 references the i-node information management table T13 (S103) and judges whether the requested file exists on the file tree (S104).

In cases where the file queried by the clients 10, 11 is not present (S104:NO), the new NAS 100 issues a response to the effect that this file does not exist to the clients 10, 11 (S105).

In cases where the file queried by the clients is present on the file tree 103 of the new NAS 100 (S104: YES), the new NAS 100 newly generates a file descriptor for the requested file (S106). The new NAS 100 then registers the generated new fd in the fd-i-node conversion table T11 (S107). That is, the i-node number of the queried (requested) file and the new fd generated for this file are associated and registered in the fd-i-node conversion table T11.

Next, the new NAS 100 checks the update flag linked to the requested file (S108) and references the fd-fd conversion table T12 (S109). The new NAS 100 judges whether the old fd for the directory received from the clients 10, 11 has been registered in the fd-fd conversion table T12 (S110).

Because, at the start of the operation of the new NAS 100, the association between the old fd and new fd is not tracked, it is judged that the old fd of the directory to which the requested file belongs has not been registered in the fd-fd conversion table T12 (Sl10:NO).

Therefore, with the old fd of the directory and the file name serving as arguments, the new NAS 100 issues a LOOKUP command to the old NAS 200 (S111), That is, the new NAS 100 sends a LOOKUP command that is the same as the LOOKUP command received by the new NAS 100 from the clients 10, 11 in S102 to the old NAS 200.

Upon receipt of the LOOKUP command from the new NAS 100 (S112), the old NAS 200 reads the old fd of the file requested by the new NAS 100 and issues the old fd to the new NAS 100 in response (S113).

Upon receipt of the old fd of the file from the old NAS 200 (S114), the new NAS 100 associates the old fd and new fd that was issued in S106 and registers the associated old fd and new fd in the fd-fd conversion table T12 (S115). Next, the new NAS 100 communicates the new fd newly generated in S106 to the clients 10, 11 (S116).

Upon receipt of the new fd of the file from the new NAS 100 (S117), the clients 10, 11 store the new fd in the cache memory (S118). Thereafter, the clients 10, 11 request file access by designating the new fd thus cached when accessing the file. Further, the processing of S111, S114, and S115 is skipped in cases where the old fd of the directory designated by the clients 10, 11 has been registered in the fd-fd conversion table T12 (S110:YES).

Therefore, in cases where a request to acquire a file descriptor is made by the clients 10, 11 to the new NAS 100, the new NAS 100 generates the new fd and communicates same to the clients 10, 11. Further, the new NAS 100 acquires the old fd from the old NAS 200, and associates and saves the old fd and new fd. As a result, as detailed in conjunction with FIGS. 16 and 17, when a request to access a file that has not been transferred to the new NAS 100 is produced, the file can be acquired from the old NAS 200 by converting the new fd to the old fd. Further, although a case where the old fd is acquired from the old NAS 200 in accordance with access by the clients 10, 11 has been described in this example, the present invention is not limited to this example as mentioned earlier. The association between the old fd and new fd can also be constructed indirectly by associating the old fd and the i-node number when the file tree structure is copied. This aspect will be described further subsequently.

Figure 16:
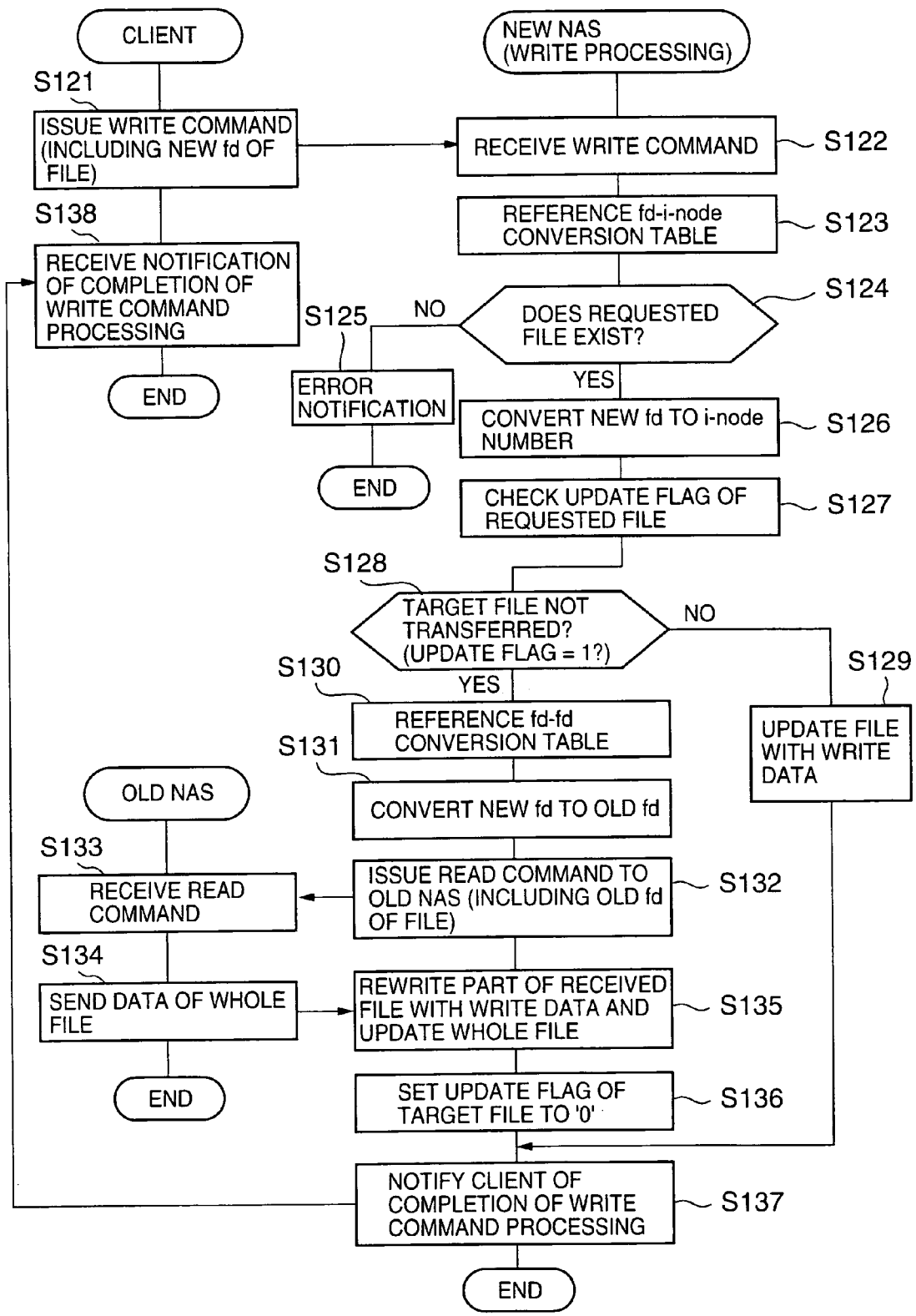
FIG. 16 is a flowchart showing an aspect in which an update request from the client is processed.

FIG. 16 is an outline flowchart for a case where an update request from the clients 10, 11 (write command) is processed. First, the clients 10, 11 issue a WRITE command by designating the new fd of the file for which an update is desired (S121). The clients 10, 11 acquire the new fd for the desired file from the new NAS 100 by means of the processing in FIG. 15.

Upon receipt of the WRITE command from the clients 10, 11 (S122), the new NAS 100 references the fd-i-n-node conversion table T11 (S123) and judges whether the file requested by the clients 10, 11 is present (S124).

In cases where the file for which an update was requested by the clients 10, 11 is not present (S124:NO), the new NAS 100 issues a response to the clients 10, 11 to the effect that the requested file does not exist (S125).

In cases where the file for which the update was requested by the clients 10, 11 is present (S124:YES), the new NAS 100 converts the new fd designated by the clients 10, 11 to the i-node number on the basis of the fd-i-node conversion table T11 (S126). Next, the new NAS 100 references the i-node information management table T13 on the basis of the i-node number and checks the update flag with which the update is associated with the requested file (S127).

The new NAS 100 judges whether or not the file for which the update was requested has been transferred to the new NAS 100 on the basis of the content of the update flag (S128). That is, it is judged whether '1' has been set for the non-transfer flag of the file for which the update was requested. When the file for which the update was requested has already been copied to the new NAS 100 (S128: NO), the new NAS 100 reads the target file from the LU 102 to memory, updates all or part of the target file and rewrites the target file to the LU 102 (S129).

In cases where the file for which the update was requested has not yet been transferred to the new NAS 100 (S128: YES), the new NAS 100 references the fd-fd conversion table T12 (S130). As a result, the new NAS 100 converts the new fd designated by the clients 10, 11 to the corresponding old fd (S131). That is, the new NAS 100 acquires the old fd of the file for which the update was requested from the fd-fd conversion table T12.

The new NAS 100 then designates the old fd of the file and issues a READ command to the old NAS 200 (S132). Upon receipt of the READ command from the new NAS 100 (S133), the old NAS 200 reads all the data of the file requested by the new NAS 100 from the LU 202 and sends the data to the new NAS 100 (S134). That is, the new NAS 100 acquires the whole of the file from the old NAS 200 even in cases where the clients 10, 11 have requested an update of only part of the file.

Upon receipt of all the data of the file from the old NAS 200, the new NAS 100 rewrites and updates all or part of the received file data and stores same in a predetermined location in the LU 102 (S135). That is, the new NAS 100 updates the file in accordance with an update request from the clients 10, 11 and saves the file at the location where the file data is to be stored. The location for storing the file data is already determined at the moment the transfer processing of the file tree structure is completed. The updated file data is saved in a predetermined directory within the new NAS 100.

After the file update is complete, the new NAS 100 sets the update flag associated with the updated file to '0' (S136). As a result, the transfer state of the file is changed from the 'untransferred state' to the 'transferred state'.

After the file update is complete, the new NAS 100 issues a report to the clients 10, 11 to the effect that the file update is complete (S137), The clients 10, 11 receive notification from the new NAS 100 and thus learn of the completion of the WRITE command processing (S138).

Therefore, in this embodiment, each time an update of the file is requested by the clients 10, 11, the requested file is copied from the old NAS 200 to the new NAS 100. Therefore, in the case of the initial update request, the response to the update request drops in a proportion corresponding to the acquisition of the file from the old NAS 200. However, after the requested file has been transferred to the new NAS 100, the request to update the file can be processed immediately.

Figure 17:
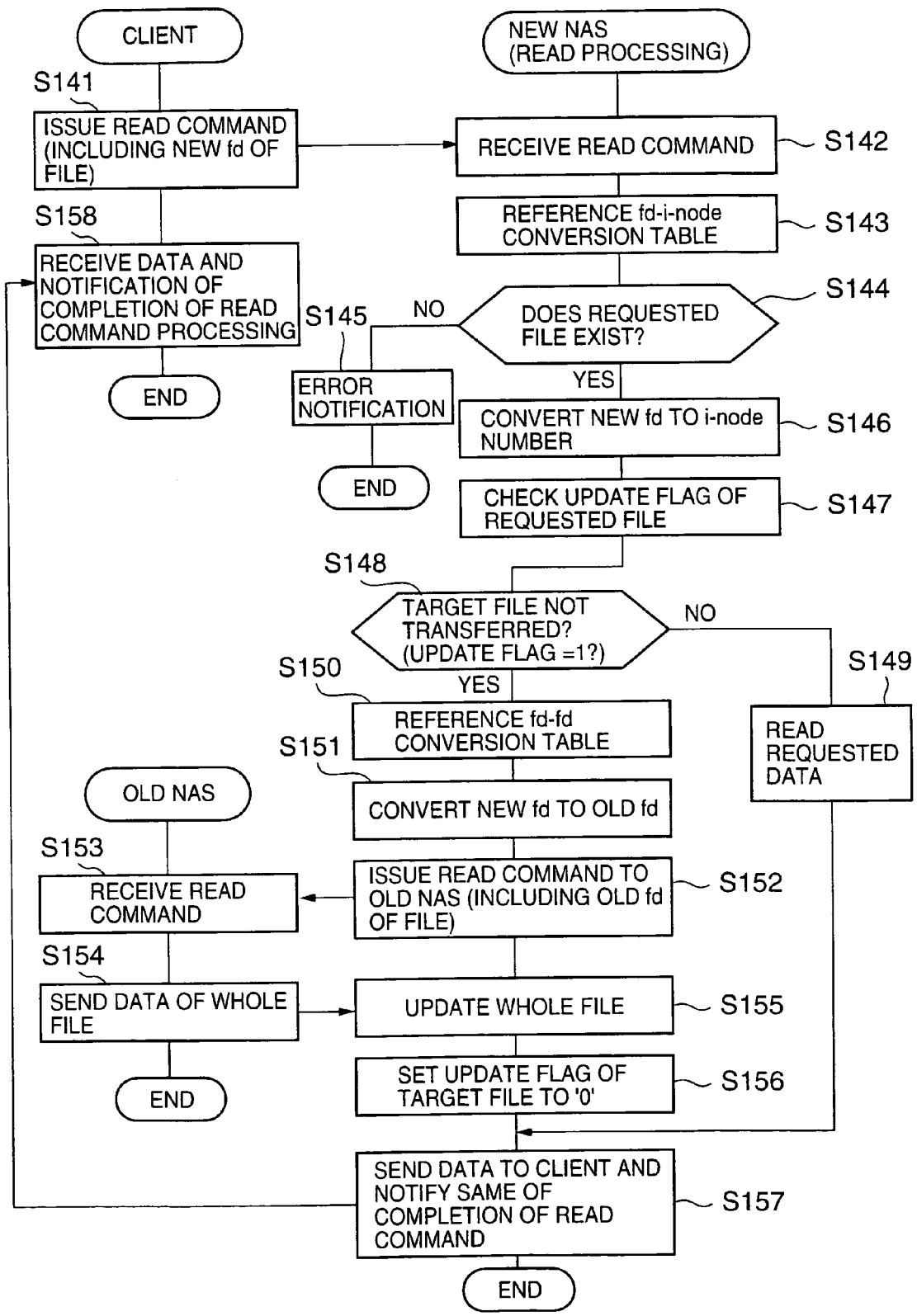
FIG. 17 is a flowchart showing an aspect in which a reference request from the client is processed.

FIG. 17 is an outline flowchart for a case where a reference request (READ command) from the clients 10, 11 is processed. First, the clients 10, 11 designate the new fd of the file for which referencing is desired and issue the READ command (S141) Upon receipt of the READ command (S142), the new NAS 100 references the fd-i-node conversion table T11 (S143) and judges whether the file for which referencing was requested is present (S144). In cases where the file for which referencing was requested by the clients 10, 11 does not exist on the file tree 103 (S144:NO), the new NAS 100 issues a response to the clients 10, 11 to the effect that the requested file does not exist (S145).

In cases where the file for which referencing was requested exists on the file tree (S144:YES), the new NAS 100 acquires the i-node number of the file on the basis of the fd-i-node conversion table T11 (S146). The new NAS 100 references the i-node information management table T13 on the basis of the i-node number and checks the update flag that is associated with the file for which referencing was requested (S147).

The new NAS 100 judges whether the file for which referencing was requested is in the untransferred state on the basis of the update flag (S148). In cases where the file for which referencing was requested has already been transferred to the new NAS 100 (S148:NO), the new NAS 100 reads the requested file from the LU 102 (S149).

In cases where the file for which referencing was requested has not yet been transferred to the new NAS 100 (S148:YES), the new NAS 100 references the fd-fd conversion table T12 (S150), the new fd designated by the clients 10, 11 is converted to an old fd (S151).

Further, the new NAS 100 designates the old fd and issues a READ command to the old NAS 200 (S152). Upon receipt of the READ command from the new NAS 100 (S153), the old NAS 200 reads all the data of the file requested by the new NAS 100 from the LU 202 and sends the data to the new NAS 100 (S154).

Upon receipt of all the data of the file from the old NAS 200, the new NAS 100 updates the data and stores same in a predetermined location (S155). That is, the new NAS 100 saves the file data acquired from the old NAS 200 in a predetermined storage location in the file tree 103 formed in the LU 102. As in the case of an update request, the new NAS 100 acquires the whole file from the old NAS 200 even in the case of a request to reference only part of the file from the clients 10, 11 and then stores the file in a predetermined location in the LU 102. As a result, the file is transferred from the old NAS 200 to the new NAS 100.

The new NAS 100 sets the update flag associated with the file to '0' and changes the file transfer state from the 'untransferred state' to the 'transferred state' (S156). Further, the new NAS 100 sends all or part of the file data for which referencing was requested to the clients 10, 11 and notifies same of the completion of the READ command processing (S157). The clients 10, 11 receive the data of the file from the new NAS 100 and confirm completion of the READ command processing (S158).

Therefore, in this embodiment, as stated for the processing of an update request, each time referencing is requested by the clients 10, 11, the requested file is copied from the old NAS 200 to the new NAS 100. Therefore, in the case of an initial reference request, the response to the reference request drops to an extent corresponding with the acquisition of the file from the old NAS 200. However, following the transfer to the new NAS 100, the reference request for the file can be processed immediately.

Because this embodiment example is constituted as above, the following results are yielded. The constitution of this embodiment example is such that NAS services are first restarted at the moment a file tree with the same structure as that of the file tree 203 of the old NAS 200 is generated in the new NAS 100 and then the requested file is transferred stepwise from the old NAS 200 to the new NAS 100 on the basis of a file access request from the clients 10, 11 to the new NAS 100. Therefore, the period of termination of NAS services can be shortened, transfers can be effected from the old NAS 200 to the new NAS 100, and hence NAS replacement can be easily performed.

Further, in this embodiment example, the new NAS 100 has a constitution in which the new fd and old fd are associated and so forth. Therefore, a transfer (replacement) of the network storage device can be performed by the new NAS 100 alone without adding any special functions to the old NAS 200.

In addition, this embodiment example has a constitution in which file data is transferred from the old NAS 200 to the new NAS 100 in a state where the pre-transfer stored content is retained without changing all the file data stored by the old NAS 200. That is, in the update request processing described in conjunction with FIG. 16, for example, the update of the file data is performed by only the new NAS 100 and a change to the stored content of the old NAS 200 is not produced. When a transfer is made from the old NAS 200 to the new NAS 100, the new NAS 100 then issues only a reference request to the old NAS 200. Therefore, transfer processing (replacement processing) from the old NAS 200 to the new NAS 100 can be performed without destroying the pre-transfer data (file groups held by the old NAS 200). Therefore, the replacement work from the old NAS 200 to the new NAS 100 can be performed relatively easily without the need to back up the stored content of the old NAS 200 beforehand prior to the start of the transfer in preparation for the unexpected.

Further, this embodiment example has a constitution in which, in cases where file access is requested by the clients 10, 11 by designating the old fd, the new fd corresponding with the requested file is issued by the new NAS 100 and the association between the old fd and new fd is held within the new NAS 100, Further, in cases where a file access request is produced by the clients 10, 11, the constitution is such that the target file is transferred from the old NAS 200 to the new NAS 100. Therefore, the clients 10, 11 are able to access the desired file simply by accessing the new NAS 100 by designating the new fd and the desired file can be transferred from the old NAS 200 to the new NAS 100 by means of this file access.

Further, this embodiment example has a constitution in which an association between the old fd and new fd is gradually constructed in accordance with a request to access the old file tree from the clients 10, 11. Therefore, preparations for the transfer of the file groups can be made within the range required by the clients 10, 11.

2. Second Embodiment Example

The second embodiment example will be described on the basis of FIGS. 18 and 19. This embodiment example is characterized by the fact that the construction of the association between the old fd and new fd is started when the file tree structure is transferred from the old NAS 200 to the new NAS 100.

Figure 18:
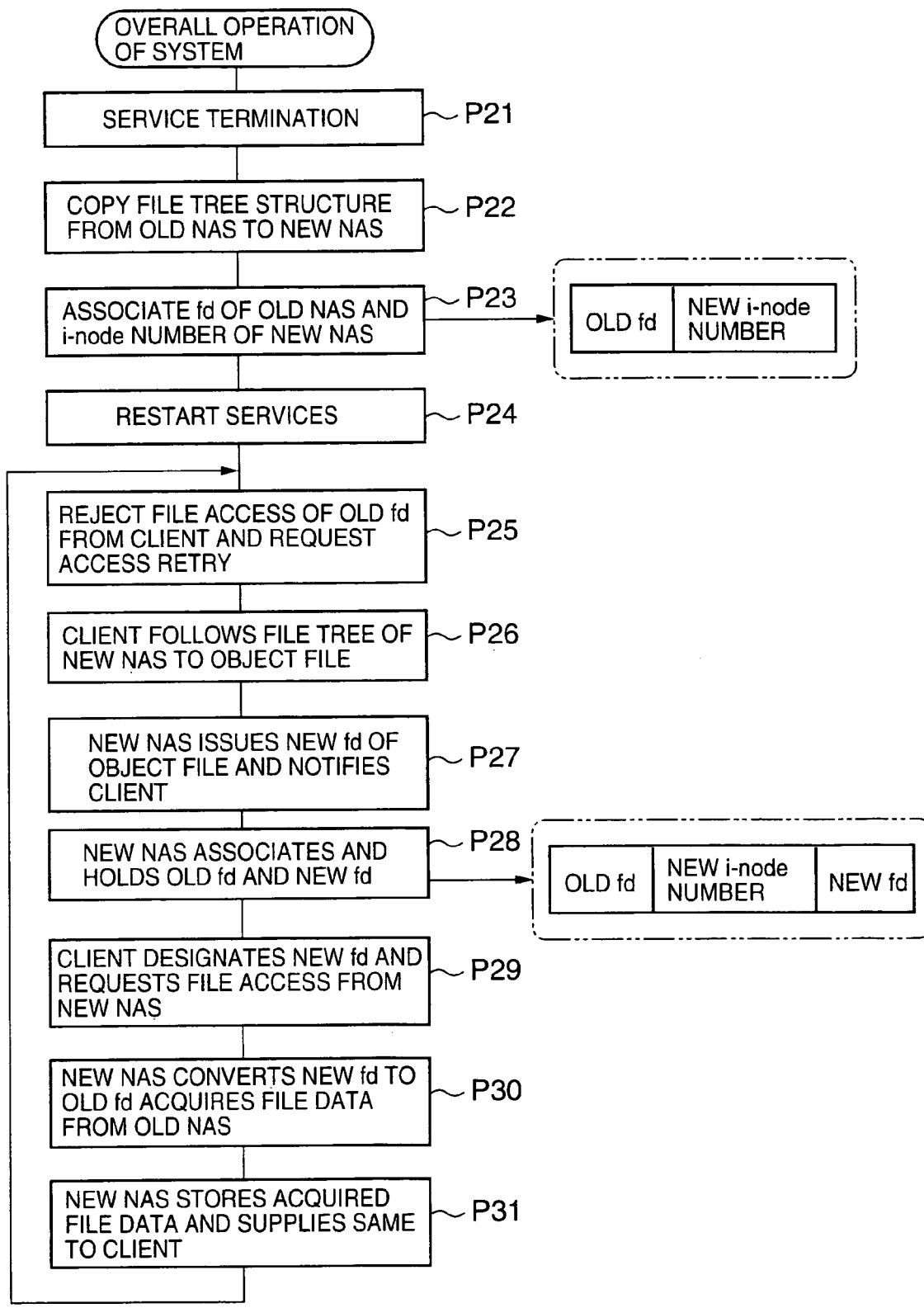
FIG. 18 is an outline flowchart of the overall operation of the storage system of a second embodiment example.

FIG. 18 is an outline flowchart showing the procedure of the overall operation of this embodiment example. The overall operation shown in FIG. 10 differs with respect to P23 and P28. P21 and P22 correspond to P1 and P2 in FIG. 10, P24 to P27 correspond to P3 to P7 in FIG. 10, and P29 to P31 correspond to P9 to P11 in FIG. 10, and hence a repetitive description of the former steps is omitted here.

When the file tree structure is copied from the old NAS 200 to the new NAS 100, the old fd managed by the old NAS 200 and the i-node number managed by the new NAS 100 are associated and saved in P23. Subsequently, in P28, an association is made between the i-node number and new fd issued in the process in which the clients 10, 11 sequentially follow the file tree from the upper directory toward the lower directory. As a result, the old fd and new fd are linked via the i-node number.

This process will be described in more detail with reference to FIGS. 19 and 20. First, the flowchart in FIG. 19 is part of the processing when the file tree structure is transferred from the old NAS 200 to the new NAS 100 and corresponds to the flowchart shown in FIG. 13. That is, S41 to S52 in FIG. 13 correspond to S161 to S172 in FIG. 19. Similarly, S54 to S57 in FIG. 13 correspond to S175 to S178 in FIG. 19. A description of each of the corresponding steps is omitted here.

Figure 19:
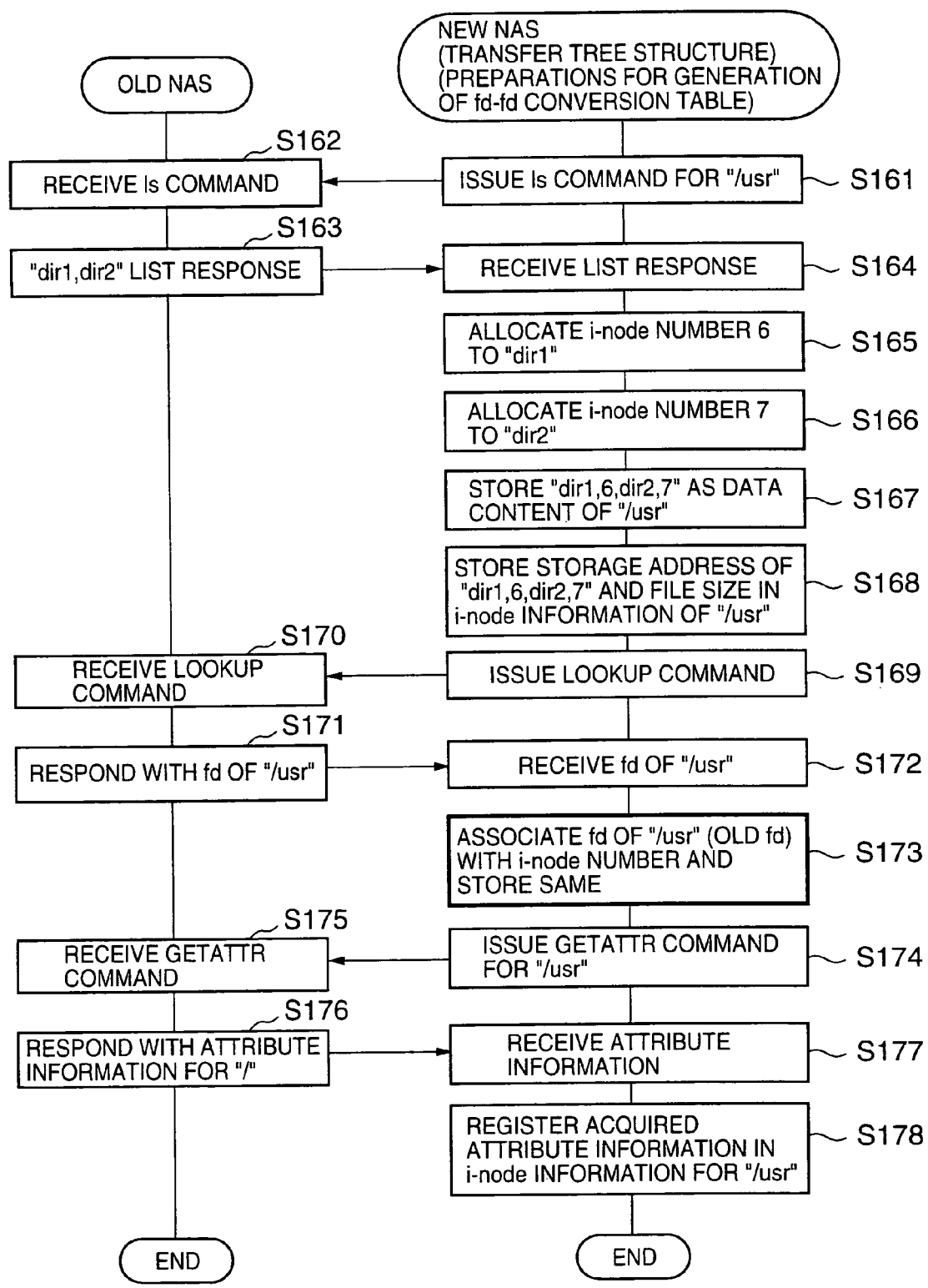
FIG. 19 is a flowchart showing an aspect in which a conversion table that associates the old fd and the new fd is generated while copying the file tree structure.
Figure 20:
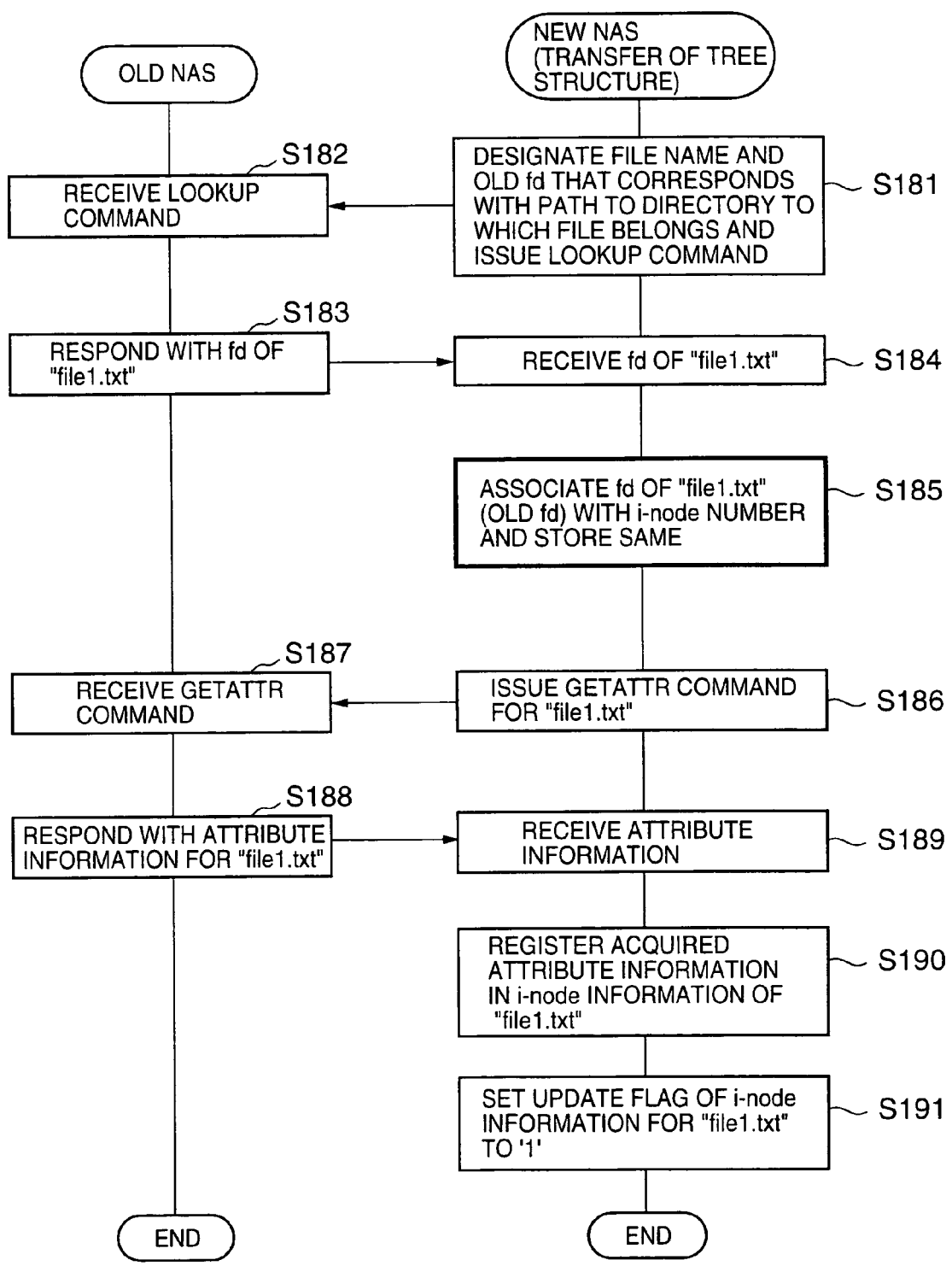
FIG. 20 is a flowchart analogous to FIG. 19 that shows an aspect in which the file structure is copied.

The flowchart in FIG. 20 is part of the processing to transfer the file tree structure as per FIG. 19 and corresponds to the flowchart shown in FIG. 14. That is, S61 to S68 in FIG. 14 correspond to S181 to S188 in FIG. 20 respectively. Likewise, S69 to S74 in FIG. 14 correspond to S190 to S195 in FIG. 20 respectively. A description of each of the corresponding steps is omitted here. In order to facilitate the description, the transfer of the directory 'usr' and file 'file1.txt' is illustrated. However, cases involving other directories and files are also processed in the same manner.

In S173 and S189, which are characteristic steps of this embodiment example, the old fd acquired from the old NAS 200 is associated with the i-node number of the new NAS 100 and then saved. That is, as detailed earlier in conjunction with FIG. 9C, the fd-i-node conversion table and fd-fd conversion table can be handled in integral fashion and the old fd corresponding with the i-node number is associated beforehand with the i-node number of the new NAS 100 and then saved. Further, in cases where the new fd is issued in accordance with a request from the clients 10, 11, the new fd and the pre-saved old fd are associated and stored.

3. Third Embodiment Example

A third embodiment example will now be described with reference to FIGS. 21 and 22. This embodiment example is characterized in that the file tree structure is copied from the old NAS 200 to the new NAS 100 in accordance with file access by the clients and an association between the old fd and new fd is constructed. That is, this embodiment example permits a transfer from the old NAS 200 to the new NAS 100 in cases where the clients 10, 11 are in an operating state.

Figure 21:
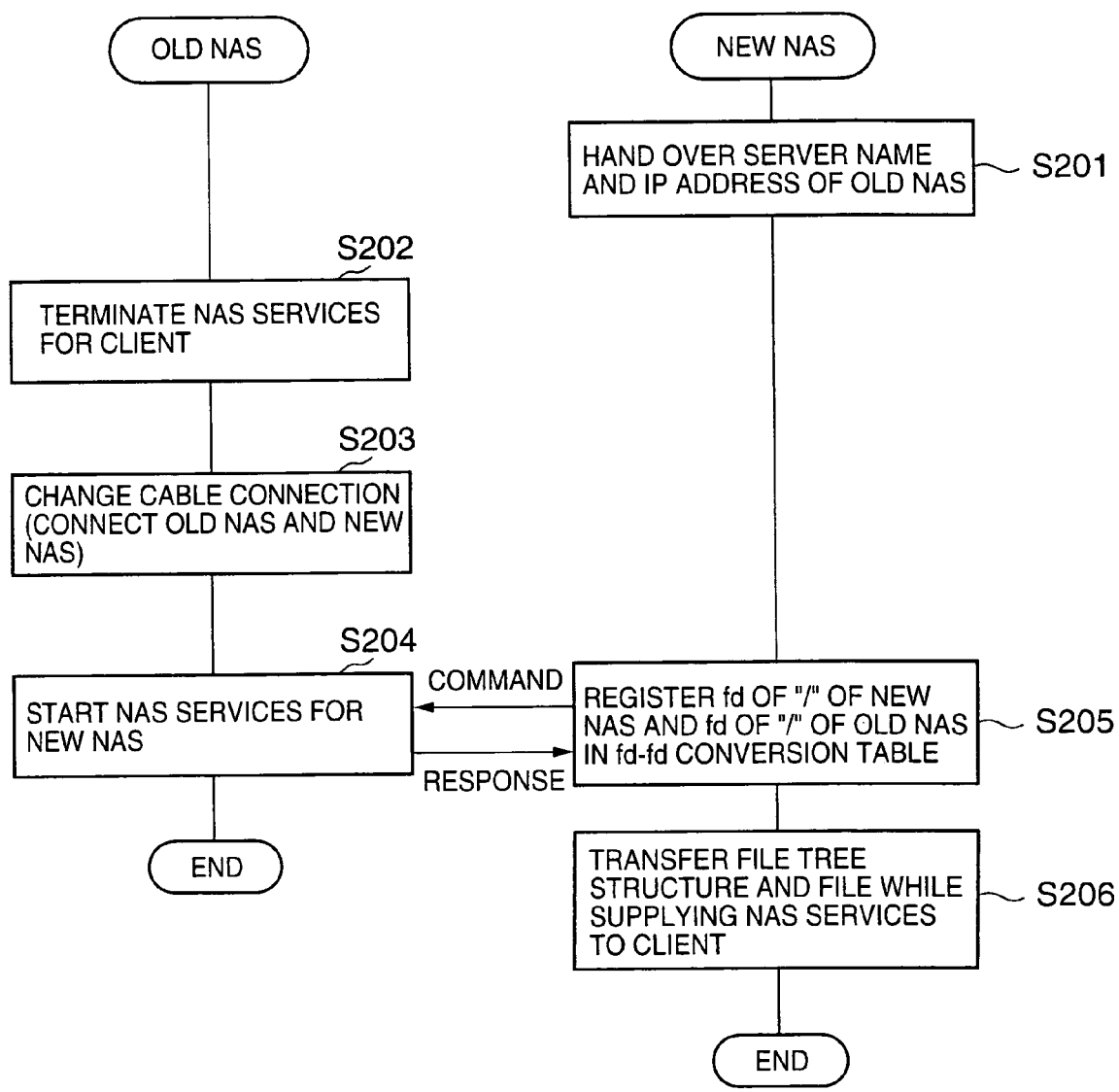
FIG. 21 is an outline flowchart of a storage system according to a third embodiment example.

FIG. 21 is a flowchart showing an outline of the overall processing of this embodiment example. First, the network configuration information of the old NAS 200 is handed over to the new NAS 100 (S201) and the old NAS 200 terminates the provision of services to the clients 10, 11 (S202). The system administrator then connects the old NAS 200 and new NAS 100 directly (S203) and allows the task of providing NAS services to be transferred from the old NAS 200 to the new NAS 100 (S204).

The new NAS 100 then associates the root directory of the old NAS 200 and the root directory of the new NAS 100 (S205). The new NAS 100 then commences the provision of services to the clients 10, 11, copies the file tree structure within the requested range in accordance with a file access request from the clients 10, 11, and transfers the file data. That is, the new NAS 100 accesses the old NAS 200 and obtains the required data and attributes, and so forth in sync with access by the clients 10, 11.

Figure 22:
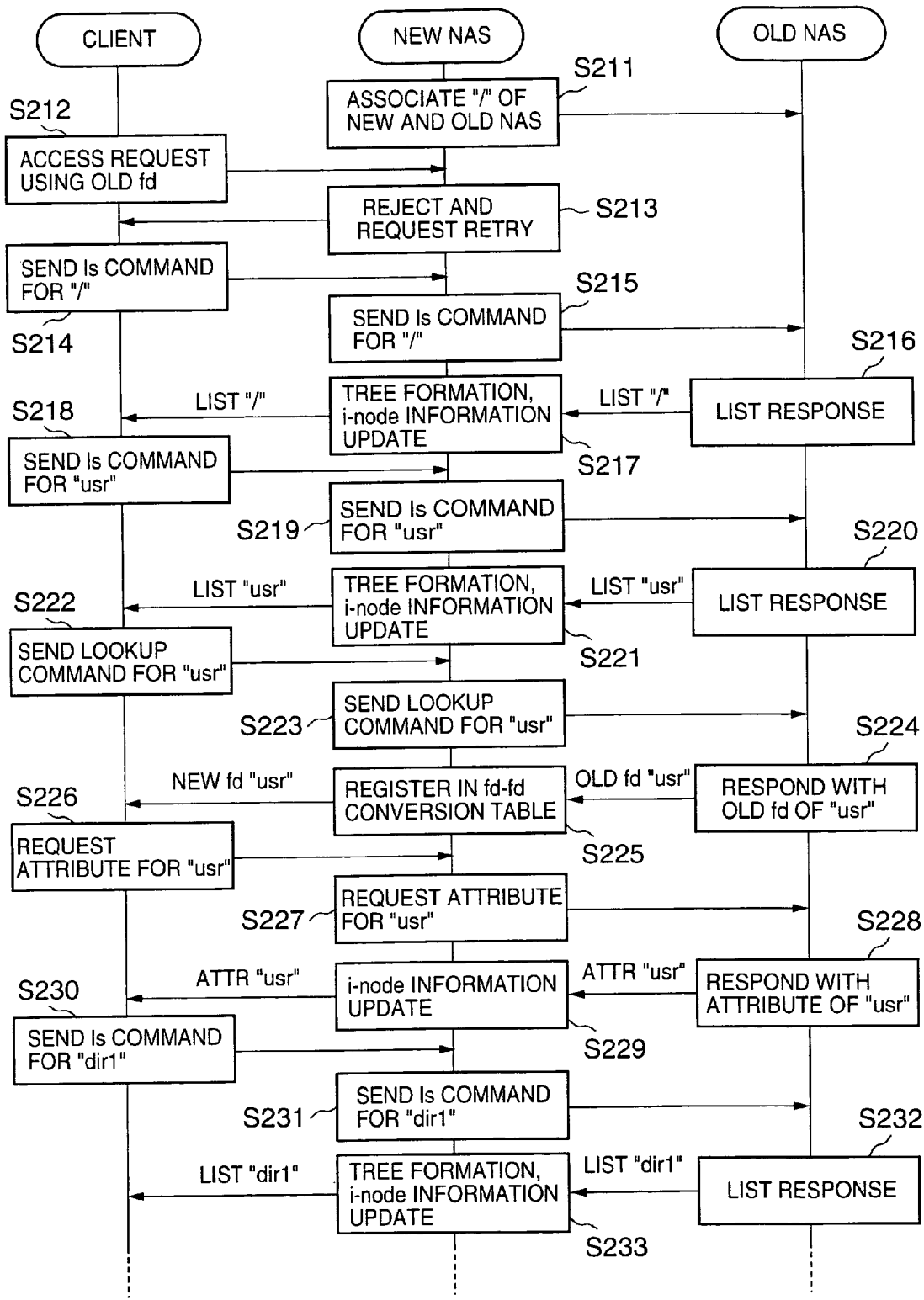
FIG. 22 is a flowchart showing an aspect in which the new NAS acquires information from the old NAS in sync with a request from the client.

FIG. 22 is a flowchart that partially shows an aspect in which the access operation by the clients 10, 11 with respect to the new NAS 100 and the access operation by the new NAS 100 with respect to the old NAS 200 are synchronized.

First, the new NAS 100 associates the new fd of the root directory of the new NAS 100 and the old fd of the root directory of the old NAS 200 (S211). Because switching from the old NAS 200 to the new NAS 100 takes place in the course of the operation of the client, the client requests access to the file by using the old fd (S212).

Because the new NAS 100 is unable to parse the old fd, the new NAS 100 rejects the file access request and asks the client to retry access (S213). The client, having received such notification from the new NAS 100, then sequentially follows the file tree from the root directory to the object file.

The client issues an ls command for the root directory to the new NAS 100 (S214). The new NAS 100 sends the ls command for the root directory to the old NAS 200 in sync with the request from the client (S215).

Upon receipt of the command from the new NAS 100, the old NAS 200 issues a response to the new NAS 100 with regard to the constitution directly below the root directory (S216). The new NAS 100 then forms a file tree within the range included in the content of the response (updates the i-node information management table) (S217) on the basis of the response from the old NAS 200. Further, the new NAS 100 issues a response to the client with regard to the constitution directly below the root directory of the file tree 103 itself (S217). Here, attention should be paid to the fact that the new NAS 100 does not transfer the content of the response from the old NAS 200 to the client as is, but instead issues a response with regard to the tree constitution of the new NAS 100 that has been updated on the basis of the content of the response from the old NAS 200.

Next, the client issues an inquiry to the new NAS 100 with regard to the directory "usr" below the root directory (S218). The new NAS 100, which has received the inquiry, then asks the old NAS 200 about the constitution below the directory "usr" (S219). When the old NAS 200 issues a response with regard to the constitution below the directory "usr" (S220), the new NAS 100 further constructs the file tree 103 and updates the i-node information (S221). The new NAS 100 then responds to the client regarding the constitution below the directory "usr" on the basis of the updated information (S221).

The client requests the fd of the directory "usr" (S222) The new NAS 100 requests the old fd of "usr" from the old NAS 200 in sync with the fd request from the client (S223). When the old NAS 200 communicates the old fd of "usr" to the new NAS 100 (S224), the new NAS 100 generates the new fd of "usr" and associates and saves the new fd and old fd (S225). The new NAS 100 then communicates the new fd of "usr" to the client (S225).

The client designates the new fd "usr" and requests acquisition of attribute information for the directory "usr" from the new NAS 100 (S226). Upon receipt of the request from the client, the new NAS 100 requests attribute information for "usr" from the old NAS 200 (S227). The new fd "usr" is converted to the old fd "usr" at the time of the request for attribute information.

The old NAS 200 reads the "usr" attribute information and sends same to the new NAS 100 in response to the request from the new NAS 100 (S228). The new NAS 100 updates the i-node information on the basis of the attribute information thus received from the old NAS 200 (S229). The new NAS 100 then sends the updated "usr" attribute information to the client (S229).

The client then issues an inquiry to the new NAS 100 with regard to the directory "dir1" that exists below the directory "usr" (S230). Upon receipt of the inquiry request from the client, the new NAS 100 issues an inquiry to the old NAS 200 with regard to the constitution below directory "dir1" (S231)

The old NAS 200 issues a response with regard to the constitution below directory "dir1" in response to the inquiry from the new NAS 100 (S232). The new NAS 100 then updates the i-node information and constructs the file tree on the basis of the content of the response from the old NAS 200 (S233).

The above processing is repeated until the client finds the object file. When the client arrives at the file, the new NAS 100 reads the data and attributes of the file from the old NAS 200, stores this information, and then supplies this information to the client.

Therefore, the new NAS 100 sequentially follows the file tree of the old NAS 200 from the upper directory to the lower directory in sync with the process in which the client sequentially follows the file tree from the upper directory to the lower directory. The new NAS 100 then constructs and saves the association between the old fd and new fd in the process of following the file tree. Therefore, this embodiment makes it possible to copy the file tree and form an association between the old fd and new fd within the range requested by the client when the client is in an operating state.

Because copying of the file tree and so forth is performed in sync with a request from the client, the load on the new NAS 100 increases. However, in a case where the client accesses a specified file or file group or the like, the data transfer of files or file groups that are being used can be completed first.

4. Fourth Embodiment Example

Figure 23:
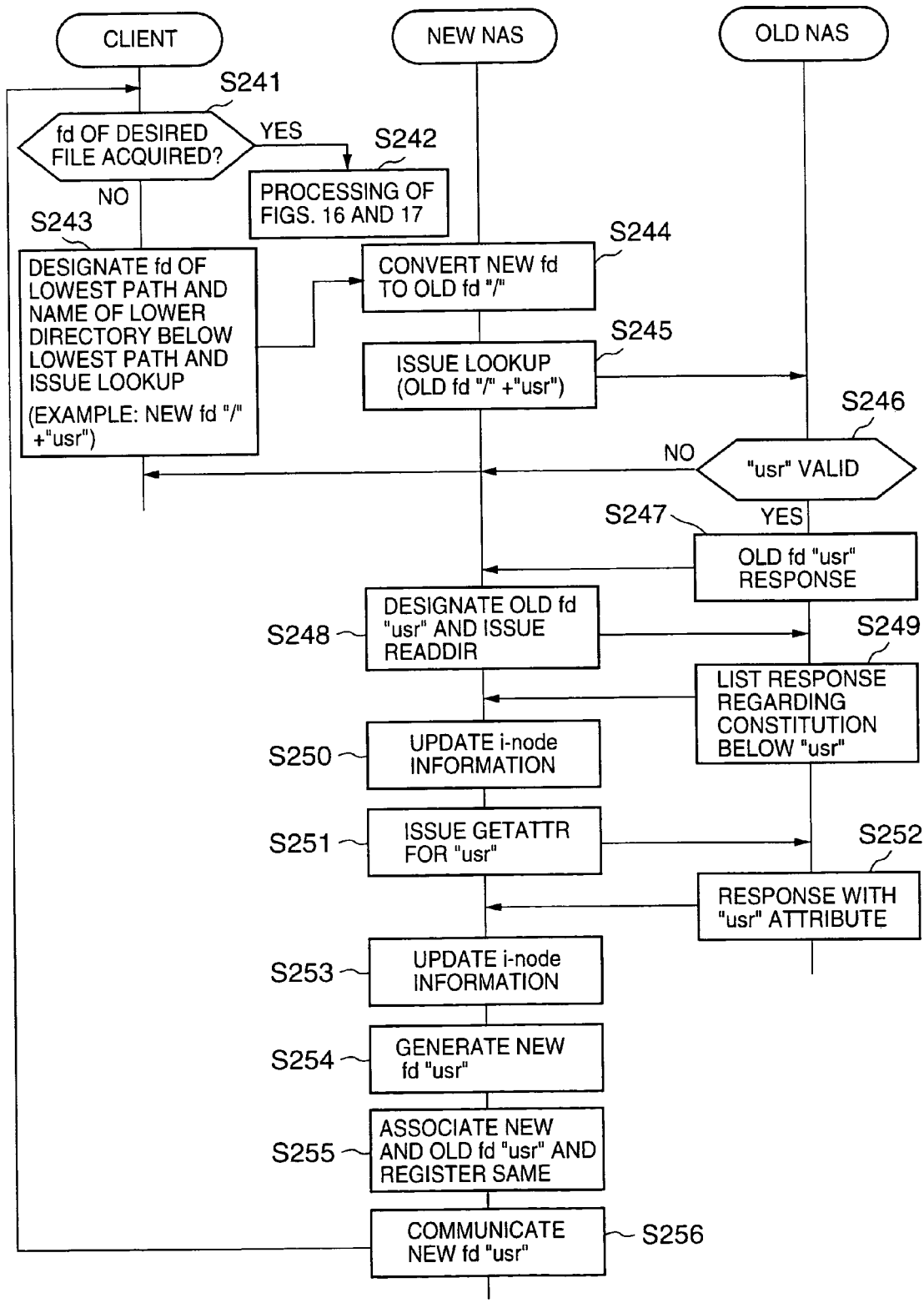
FIG. 23 is a flowchart showing an aspect in which the client acquires the new fd while sequentially following the new NAS file tree, according to a fourth embodiment example.

A fourth embodiment example will now be described with reference to FIG. 23. This embodiment example shows the details of a case where the client sequentially follows the file tree 103 of the new NAS 100 from the upper directory toward the lower directory.

In cases where the client access a file, it is judged whether a new fd for specifying the desired file has been obtained (S241). When a new fd has already been obtained (S241: YES), write access, read access, and so forth, can be performed by designating the new fd of the desired file as shown in FIGS. 16, 17 and so forth (S242).

On the other hand, in cases where the new fd of the desired file has not yet been obtained (S241:NO), the client designates the new fd of the lowest path currently known and the name of the directory below the path and then issues a LOOKUP command (S243). At first, because only the new fd of the root directory is known, the client issues an inquiry to the new NAS 100 by designating the new fd of the root directory and the name "usr" of the directory below the root directory.

The new NAS 100 converts the new fd of the root directory to the old fd (S244) and issues an inquiry to the old NAS 200 by designating the old fd of the root directory and the name "usr" of the directory (S245).

The old NAS 200 communicates the old fd of the directory "usr" in response to the inquiry from the new NAS 100 (S246). The new NAS 100 uses the old fd of the directory "usr" to issue the READDIR command (S247).

Upon receiving the READDIR command, the old NAS 200 issues a response regarding the constitution below the directory "usr" (S248). The new NAS 100 updates the i-node information on the basis of the response from the old NAS 200 (S249). The new NAS 100 also requests the acquisition of attribute information for the directory "usr" (S251). The old NAS 200 sends attribute information for the directory "usr" to the new NAS 100 in accordance with the attribute information acquisition request (S252).

The new NAS 100 updates the i-node information on the basis of the content of the response from the old NAS 200 (S253) and generates the new fd for specifying the directory "usr" (S254). After associating and saving the new fd and old fd (S255), the new NAS 100 then communicates the new fd of the directory "usr" to the client (S256).

The client, which has thus received the new fd, then designates the new fd of the directory "usr" and the name of the directory ("dir1") below the directory "usr" and resends the LOOKUP command (S243). The above processing is repeated until the new fd of the object file is obtained and, in cases where the new fd of the object file is obtained, the processing proceeds to S242.

5. Fifth Embodiment Example

Figure 24:
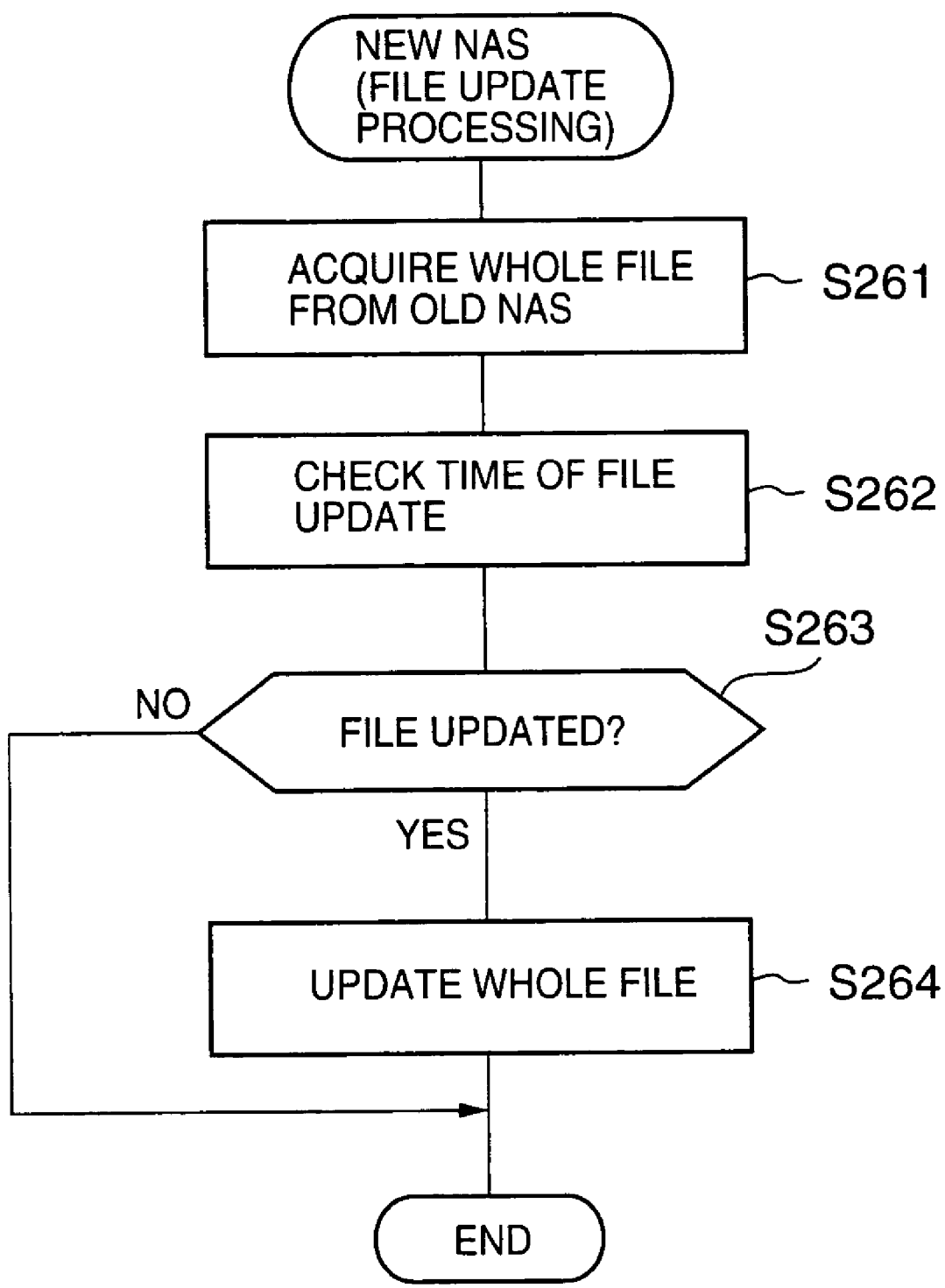
FIG. 24 is a flowchart showing an aspect in which a file is transferred from the old NAS to the new NAS in a case where a file update is performed at or beyond a predetermined time, according to a fifth embodiment example.

Next, FIG. 24 is a flowchart showing an outline of the file update processing according to a fifth embodiment example. The flowchart shown in FIG. 24 is equivalent to a modified example of S155 in FIG. 17. This embodiment example is characterized in that the transfer from the old NAS 200 to the new NAS 100 is controlled by taking the file usage frequency into account.

The example shown in FIG. 17 has a constitution in which, in the event of a file reference request from the clients 10, 11, all the data of the requested file can be copied from the old NAS 200 to the new NAS 100 and then updated and stored in the new NAS 100.

On the other hand, in the file update processing shown in FIG. 24, after all the data of the file has been acquired from the old NAS 200 (S261), the new NAS 100 confirms the time of the update to the acquired file (S262). The new NAS 100 then judges whether to update and store the file, that is, whether to save the file in the LU 102 of the new NAS 100 on the basis of the file update time (S263). In cases where the file acquired from the old NAS 200 is updated and stored (S263:YES), the new NAS 100 stores the whole of the acquired file in the LU 102 (S264).

Here, a variety of conditions may be adopted, depending on the case, as conditions for judging whether to update and store a file (transfer to the new NAS) on the basis of the file update time. For example, when the time to update the file for which referencing was requested by the clients 10, 11 is such that the file has not been updated for a predetermined time such as for three years or five years, the constitution can be such that the transfer is not made from the old NAS 200 to the new NAS 100. Therefore, each time a reference request is generated for a file that has not been updated for a predetermined time or more and that has only undergone referencing, the file is read each time from the old NAS 200 and supplied to the clients 10, 11.

Therefore, in a case where the file usage frequency is low, the file remains in the old NAS 200. As a result, copying of a file with a low usage frequency to the new NAS 100 is prevented beforehand, whereby the storage resources (LU102) of the new NAS 100 can be efficiently employed. As a result, unnecessary files can be naturally selected and allocation management of the amount used by the user (QUOTA) and so forth can be appropriately performed in accordance with the transfer from the old NAS 200 to the new NAS 100.

Further, in cases where the clients 10, 11 require the file, the update request may be issued rather than a reference request. The file is then copied to the NAS 100 as a result of the clients 10, 11 requesting a file update.

6. Sixth Embodiment Example

Figure 25:
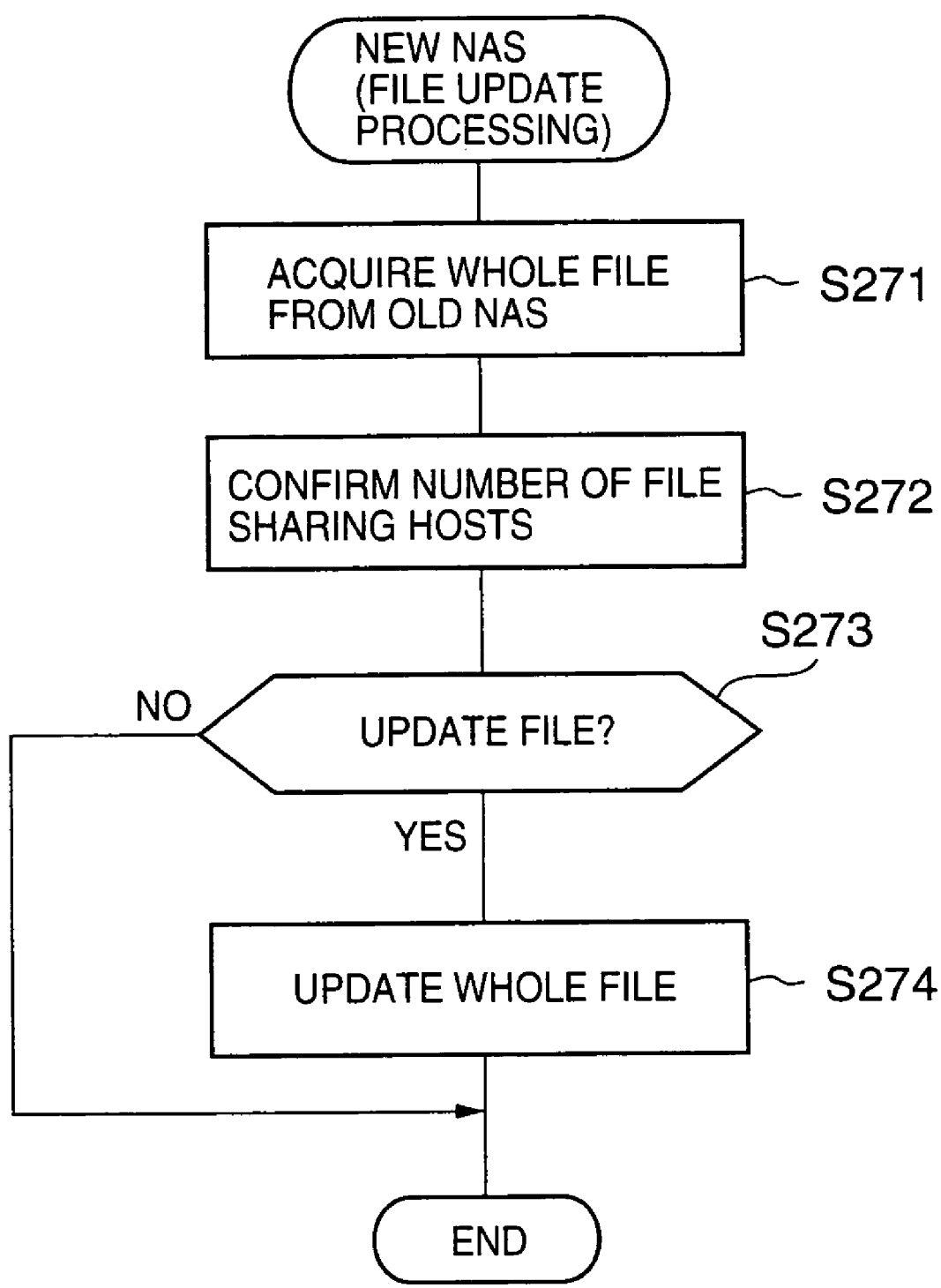
FIG. 25 is a flowchart showing an aspect in which a file is transferred from the old NAS to the new NAS in a case where the number of file sharing hosts is equal to or more than a predetermined value, according to a sixth embodiment example.

FIG. 25 shows file update processing according to a sixth embodiment example. This embodiment example is characterized in that the number of sharing hosts (number of clients) using the file is considered as an indicator for measuring the file usage frequency.

In file update processing, the new NAS 100 acquires all the file data from the old NAS 200 (S271) and then checks the number of sharing hosts using the acquired file (S272). Further, the new NAS 100 judges whether to update and store the file, that is, whether to save the file in the LU 102 of the new NAS 100 on the basis of the number of sharing hosts (S273). When the file acquired from the old NAS 200 is updated and stored (S273:YES), the new NAS 100 stores the whole of the acquired file in the LU 102 (S274).

For example, the constitution may be such that, in cases where the number of clients sharing the file is smaller than a predetermined value that is preset, the file is not copied to the new NAS 100.

Further, the present invention is not limited to the above embodiment. A person skilled in the art can make a variety of additions and modifications within the scope of the present invention. For example, each of the embodiment examples can be suitably combined.

For example, although examples of file descriptors constituting file identification information have been suggested, the present invention is not limited to file descriptors. Other identifying information may also be used as a file handle. Further, although an NFS case was principally described in the above embodiment, the present invention can also be applied in CIFS or other cases. In a CIFS case, an MFT (Master File Table), which is equivalent to an i-node aggregate, can be employed instead of an i-node. The MFT is a map for specifying the actual position of the file.

Further, although the time elapsed from the last update time, the number of sharing hosts, and so forth are illustrated as indicators for measuring the file usage frequency, other indicators may be used. The number of times access is made per unit of time may be used or a plurality of indicators such as the time elapsed from the update time, the number of sharing hosts, and the number of times access is made per unit of time may be suitably combined.

Further, the fd-fd conversion table formed in the new NAS is unnecessary in cases where the data of the file is completely transferred from the old NAS to the new NAS. That is, in cases where the file groups are completely transferred from the old NAS to the new NAS, the fd-fd conversion table can be deleted. Overheads can be cancelled and performance degradation can be prevented by deleting unnecessary fd-fd conversion tables.

What is claimed is:

1. A network storage system having a first network storage device for storing a file that is supplied to a client and a second network storage device that is connected to the client and the first network storage device, comprising:

a file tree generation unit that generates a second file tree, which has the same structure as that of a first file tree of the first network storage device, on the second network storage device as a hierarchical directory structure of a file system thereof without transferring data in files of the first file tree to the second network storage device;

a file specifying unit for specifying an access target file on the first network storage device that is requested by the client on the basis of an access request made to the second network storage device by the client in order to access the access target file on the first network storage device; and a file transfer unit that acquires attributes and data of the specified access target file from the first network storage device and stores the acquired attributes and data in a predetermined location in the second file tree, wherein the file specifying unit enables the client to follow the second file tree on the second network storage device from a root directory thereof downward to indicate the access target file thereon, after the second file tree is generated on the second network storage device;

the file specifying unit acquires first file identifying information for specifying the access target file on the first network storage device from the first network storage device, when the client indicates the access target file in the second file tree by following the second file tree;

the file specifying unit issues second file identifying information for specifying the access target file on the second network storage device, and communicates the issued second file identifying information to the client;

the file specifying unit associates the first file identifying information acquired from the first network storage device with the issued second file identifying information, and manages the associated first and second file identifying information;

when the second network storage device receives from the client an access request for accessing the access target file designating the second file identifying information, the file specifying unit converts the second file identifying information designed in the access request into the first identifying information associated therewith;

the file transfer unit acquires data of the access target file from the first network storage device by using the converted first file identifying information and the file transfer unit stores the data of the access target file acquired from the first network storage device in the second file tree on the second network storage device, and provides the acquired data of the access target file for the client to access.

2. The network storage system according to claim 1, further comprising:

a communication unit for handing over the network configuration information of the first network storage device to the second network storage device and that allows the second network storage device to supply file sharing services to the client on behalf of the first network storage device.

3. The network storage system according to claim 1, wherein the file transfer unit acquires the file from the first network storage device and stores the file in a predetermined location in the second file tree without changing the stored content of the first network storage device.

4. The network storage system according to claim 1, wherein, in cases where the access request from the client is a request to reference a file that exists on the first network storage device, the file transfer unit acquires the attributes and data of the file specified on the first network storage device by the file specifying unit from the first network storage device and supplies the attributes and data to the client, and stores the acquired file in a predetermined location in the second file tree.

5. The network storage system according to claim 4, wherein, in cases where the file acquired from the first network storage device satisfies a predetermined condition, the file transfer unit stores the acquired file in a predetermined location in the second file tree.

6. The network storage system according to claim 5, wherein, in cases where the file usage frequency acquired from the first network storage device is equal to or more than a predetermined value, the predetermined condition is judged to have been fulfilled and the acquired file is stored in a predetermined location in the second file tree.

7. The network storage system according to claim 1, wherein, in cases where the access request from the client is a request to update a file that exists on the first network storage device, the file transfer unit acquires the attributes and data of the file specified on the first network storage device by the file specifying unit from the first network storage device, updates the acquired file, and stores the updated file in a predetermined location in the second file tree.

8. The network storage system according to claim 1, wherein the file tree generation unit generates the second file tree by associating transfer state information indicating whether a file on the first network storage device has been transferred to a predetermined location on the second file tree with the structure of the second file tree.

9. The network storage system according to claim 1, wherein the file tree generation unit, the file specifying unit, and the file transfer unit are implemented on the second network storage device.

10. A method for handing over file sharing services for a client between a plurality of network storage devices, comprising the steps of:

handing over network configuration information of a first one of the network storage devices to a second one of the network storage devices;

terminating file sharing services supplied from the first network storage device to the client;

generating a second file tree, which has the same structure as that of the first file tree of the first network storage device, on the second network storage device as a hierarchical directory structure of a file system thereof without transferring data in files of the first file tree to the second network storage device;

starting file sharing services supplied to the client by the second network storage device;

specifying an target access file requested by the client in the first network storage device on the basis of a request by the client made to the second network storage device in order to access the target access file on the first network storage device; and acquiring attributes and data of the specified access target file from the first network storage device and storing the acquired attributes and data in a predetermined location in the second file trees, wherein the specifying step involves:

enabling the client to follow the second file tree on the second network storage device from a root directory thereof downward to indicate the access target file thereon, after the second file tree is generated on the second network storage device;

acquiring first file identifying information for specifying the access target file on the first network storage device from the first network storage device, when the client indicates the access target file in the second file tree by following the second file tree;

issuing second file identifying information for specifying the access target file on the second network storage device, and communicating the issued second file identifying information to the client;

associating the first file identifying information acquired from the first network storage device with the issued second file identifying information, and managing the associated first and second file identifying information;

when the second network storage device receives from the client an access request for accessing the access target file designating the second file identifying information, converting the second file identifying information designed in the access request into the first identifying information associated therewith;

wherein the acquiring step involves:

acquiring data of the access target file from the first network storage device by using the converted first file identifying information; and storing the data of the access target file acquired from the first network storage device in the second file tree on the second network storage device, and providing the acquired data of the access target file for the client to access.

11. The handover method between a plurality of network storage devices according to claim 10, wherein a step of connecting the first network storage device and the second network storage device to render same capable of bidirectional communication is provided before the step of generating the second file tree.

12. The handover method between a plurality of network storage devices according to claim 10, wherein, in the step of storing the file acquired from the first network storage device in a predetermined location in the second file tree, the file acquired from the first network storage device is stored in a predetermined location in the second file tree without changing the stored content of the first network storage device.

13. The handover method between a plurality of network storage devices according to claim 10, wherein, in the step of storing a file acquired from the first network storage device in a predetermined location in the second file tree, the acquired file is stored in a predetermined location in the second file tree in cases where the acquired file fulfils a predetermined condition.

14. The handover method between a plurality of network storage devices according to claim 10, wherein the step of generating the second file tree in the second network storage device generates the second file tree while associating transfer state information, which indicates whether a file on the first network storage device has been transferred to a predetermined location in the second file tree, with the structure of the second file tree.

* * * * *